US 11,799,339 B2

(12) United States Patent
Hattori

(10) Patent No.: US 11,799,339 B2
(45) Date of Patent: Oct. 24, 2023

(54) ROTATING ELECTRIC MACHINE

(71) Applicant: TOYOTA JIDOSHA KABUSHIKI KAISHA, Toyota (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/234,130

(22) Filed: Apr. 19, 2021

(65) Prior Publication Data
US 2021/0399600 A1 Dec. 23, 2021

(30) Foreign Application Priority Data

Jun. 23, 2020 (JP) .................. 2020-107683

(51) Int. Cl.
| | | |
|---|---|---|
| H02K 1/30 | (2006.01) | |
| H02K 1/27 | (2022.01) | |
| H02K 21/14 | (2006.01) | |
| H02K 9/19 | (2006.01) | |
| H02K 1/276 | (2022.01) | |
| B60L 50/51 | (2019.01) | |

(52) U.S. Cl.
CPC .............. *H02K 1/30* (2013.01); *H02K 1/276* (2013.01); *H02K 9/19* (2013.01); *H02K 21/14* (2013.01); *B60L 50/51* (2019.02)

(58) Field of Classification Search
CPC .......... B60L 50/51; H02K 1/276; H02K 1/28; H02K 1/30; H02K 1/32; H02K 21/14; H02K 7/003; H02K 9/19

USPC ...................................................... 310/156.18
See application file for complete search history.

(56) References Cited

U.S. PATENT DOCUMENTS

| | | | | |
|---|---|---|---|---|
| 7,843,101 B2* | 11/2010 | Ito | ............................ | H02K 1/28 |
| | | | | 417/423.1 |
| 9,048,712 B2* | 6/2015 | Lee | ........................... | H02K 1/28 |
| 9,673,669 B2* | 6/2017 | Yamada | ................. | H02K 21/16 |
| 9,762,098 B2* | 9/2017 | Oketani | .................... | H02K 1/28 |
| 10,505,418 B2* | 12/2019 | Baraka | ...................... | H02K 3/04 |
| 2015/0288235 A1* | 10/2015 | Tojima | ................... | H02K 16/04 |
| | | | | 310/46 |
| 2019/0190335 A1* | 6/2019 | Sim | .......................... | H02K 1/30 |
| 2020/0112216 A1 | 4/2020 | Galmiche et al. | | |

FOREIGN PATENT DOCUMENTS

| | | |
|---|---|---|
| DE | 10 2012 110 147 A1 | 4/2014 |
| DE | 10 2018 200 865 A1 | 7/2019 |
| JP | 2011-019298 A | 1/2011 |
| JP | 2011-097781 A | 5/2011 |
| JP | 2014-155243 A | 8/2014 |
| JP | 2018-098968 A | 6/2018 |

* cited by examiner

*Primary Examiner* — Alex W Mok
(74) *Attorney, Agent, or Firm* — Oliff PLC

(57) ABSTRACT

A rotating electric machine includes a rotor having a rotor core, a stator having a stator core and a stator coil, a first rotating shaft member having a first flange portion and a first shaft portion, a second rotating shaft member having a second flange portion and a second shaft portion, and a fastening device that fastens the first and second rotating shaft members, in a condition where the rotor core is sandwiched between the first and second flange portions, from opposite sides of the rotor core in an axial direction.

6 Claims, 18 Drawing Sheets

ROTATING ELECTRIC MACHINE

CROSS-REFERENCE TO RELATED APPLICATION

This application claims priority to Japanese Patent Application No. 2020-107683 filed on Jun. 23, 2020, incorporated herein by reference in its entirety.

BACKGROUND

1. Technical Field

The disclosure relates to a rotating electric machine.

2. Description of Related Art

A rotating electric machine as described in Japanese Unexamined Patent Application Publication No. 2018-098968 (JP 2018-098968 A) includes a rotor having a rotor shaft as a rotating shaft member and an annular rotor core, and a stator having an annular stator core that is placed with a radial spacing from the rotor core, and a stator coil.

SUMMARY

After the rotor shaft is inserted into a shaft hole of the rotor core, the rotor shaft may be fixed to the rotor core, by fitting the rotor shaft in the rotor core through shrinkage fitting using heating equipment, or press fitting using press-fit equipment, or by joining the rotor shaft to the rotor core by laser welding using welding equipment. In this case, fixing work is cumbersome and complicated.

This disclosure provides a rotating electric machine that allows a rotating shaft member to be easily fixed to a rotor core.

A rotating electric machine according to one aspect of the disclosure includes a rotor having a rotor core that is rotatable about an axis, a stator having a stator core placed with a radial spacing from the rotor, and a stator coil provided on the stator core, a first rotating shaft member having a first flange portion having a first contact face that is in contact with a first end face of the rotor core in an axial direction, and a first shaft portion provided on a face of the first flange portion opposite to the first contact face, a second rotating shaft member having a second flange portion having a second contact face that is in contact with a second end face of the rotor core in the axial direction, and a second shaft portion provided on a face of the second flange portion opposite to the second contact face, and a fastening device that fastens the first rotating shaft member and the second rotating shaft member, in a condition where the rotor core is sandwiched between the first flange portion and the second flange portion, from opposite sides of the rotor core in the axial direction.

In the rotating electric machine according to the above aspect of the disclosure, the first rotating member and the second rotating member are fastened with the fastening device, in the condition where the rotor core is sandwiched between the first flange portion of the first rotating shaft member and the second flange portion of the second rotating shaft member, from the opposite sides of the rotor core in the axial direction, so that the first rotating shaft member and the second rotating shaft member are fixed to the rotor core. Thus, it is possible to easily fix the first rotating shaft member and the second rotating shaft member to the rotor core, without inserting the first rotating shaft member and second rotating shaft member into the shaft hole of the rotor core, and fitting the shaft members in the rotor core by shrinkage fitting or press fitting, or joining the shaft members to the rotor core by laser welding.

In the rotating electric machine as described above, the rotor core may include a first fitting portion and a second fitting portion on the same axis as the axis of the rotor core, and the first rotating shaft member may have a first fitted portion that is fitted in the first fitting portion, while the second rotating shaft member may have a second fitted portion that is fitted in the second fitting portion.

With the above arrangement, the first fitted portion and the second fitted portion are respectively fitted in the first fitting portion and second fitting portion of the rotor core, so that the first rotating shaft member and the second rotating shaft member are aligned with each other with increased accuracy.

In the rotating electric machine as described above, the fastening device may comprise a plurality of bolts, and the rotor core may have a plurality of bolt insertion holes through which the bolts are inserted, and which extend through the rotor core in the axial direction. The first flange portion may have a plurality of first insertion holes, at positions corresponding to positions of the bolt insertion holes, and the second flange portion may have a plurality of second insertion holes, at positions corresponding to the positions of the bolt insertion holes. The bolts may have male screws, and the first insertion holes or the second insertion holes may have female screws that engage with the male screws.

With the above arrangement, the first rotating shaft member and the second rotating shaft member are fastened with the bolts; therefore, large shaft force can be obtained, and the first rotating shaft member and second rotating shaft member can be firmly fixed to the rotor core, as compared with the case where a single shaft having a larger length in the axial direction than the rotor core is inserted into and fixed to the rotor core.

In the rotating electric machine as described above, the fastening device may comprise a plurality of bolts and a plurality of nuts, and the rotor core may have a plurality of bolt insertion holes through which the bolts are inserted, and which extend through the rotor core in the axial direction. The first flange portion may have a plurality of first insertion holes through which the bolts are inserted, at positions corresponding to positions of the bolt insertion holes, and the second flange portion may have a plurality of second insertion holes through which the bolts are inserted, at positions corresponding to the positions of the bolt insertion holes.

The above arrangement makes it unnecessary to form female screws to be engaged with male screws formed on the bolts, in the first insertion holes of the first flange portion or the second insertion holes of the second flange portion. This may lead to reduction of the cost.

In the rotating electric machine as described above, the fastening device may comprise a plurality of rivets, and the rotor core may have a plurality of rivet insertion holes through which the rivets are inserted, and which extend through the rotor core in the axial direction. The first flange portion may have a plurality of first insertion holes through which the rivets are inserted, at positions corresponding to positions of the rivet insertion holes, and the second flange portion may have a plurality of second insertion holes through which the rivets are inserted, at positions corresponding to the positions of the rivet insertion holes.

The above arrangement makes it unnecessary to form female screws to be engaged with male screws formed on the bolts, or additionally provide nuts; therefore, the processing cost and the number of components can be reduced, which may lead to reduction of the cost.

In the rotating electric machine as described above, the rotor core may have a core through-hole having the same axis as the axis of the rotor core, and the first rotating shaft member may have a first shaft member through-hole that has the same axis as the axis of the rotor core and communicates with the core through-hole, while the second rotating shaft member may have a second shaft member through-hole that has the same axis as the axis of the rotor core and communicates with the core through-hole. At least one of the first flange portion and the second flange portion may have a flange through-hole that communicates with the core through-hole.

With the above arrangement, a part of cooling oil that flows along an inner circumferential wall of the core through-hole in the rotor core is discharged through the flange through-hole. Thus, the cooling oil is less likely or unlikely to remain on the inner circumferential wall of the core through-hole.

In the rotating electric machine as described above, the rotor core may include a plurality of permanent magnets, and the rotor core may have a core through-hole having the same axis as the axis of the rotor core, The first rotating shaft member may have a first shaft member through-hole that has the same axis as the axis of the rotor core and communicates with the core through-hole, and the second rotating shaft member may have a second shaft member through-hole that has the same axis as the axis of the rotor core and communicates with the core through-hole. The rotor core may have a plurality of slits that radially extend from an inner circumferential surface of the rotor core defining the core through-hole, to the vicinity of the permanent magnets.

With the above arrangement, the cooling oil flows in radial directions in the slits provided in the rotor core, to the vicinity of the permanent magnets, so that the capability of cooling the rotor core and the permanent magnets can be enhanced.

In the rotating electric machine according to the disclosure, the first rotating shaft member and the second rotating shaft member are fastened with the fastening device, in the condition where the rotor core is sandwiched between the first flange portion of the first rotating shaft member and the second flange portion of the second rotating shaft member, from the opposite sides of the rotor core in the axial direction, so that the first rotating shaft member and the second rotating shaft member are fixed to the rotor core. Thus, the rotating electric machine provides the effect that it is possible to easily fix the first rotating shaft member and the second rotating shaft member to the rotor core, without inserting the first rotating shaft member and second rotating shaft member into the shaft hole of the rotor core, and fitting the shaft members in the rotor core by shrinkage fitting or press fitting, or joining the shaft members to the rotor core by laser welding.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

First Embodiment

A rotating electric machine as a first embodiment of the disclosure will be described. It is, however, to be understood that the disclosure is not limited by this embodiment.

Figure 1:
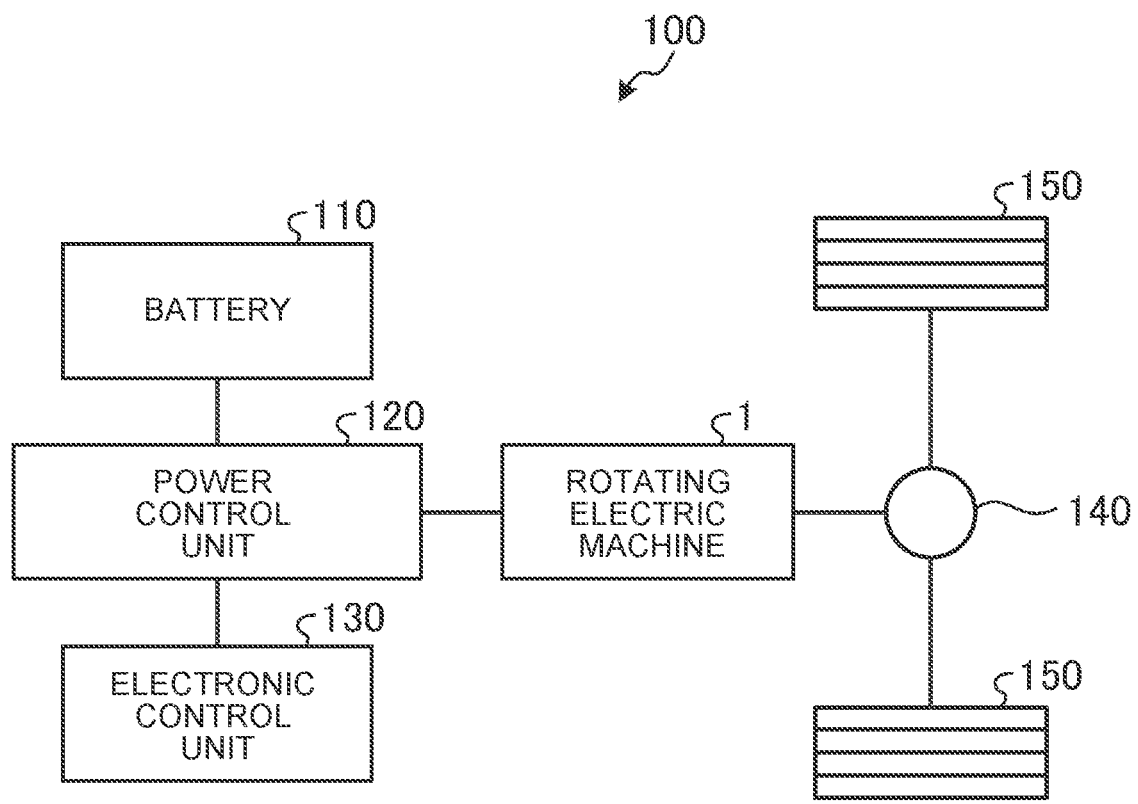
FIG. 1 is a block diagram showing the configuration of an electric vehicle in which a rotating electric machine according to a first embodiment is used.

FIG. 1 is a block diagram showing the configuration of an electric vehicle 100 in which the rotating electric machine 1 according to the first embodiment is used. The electric vehicle 100 includes the rotating electric machine 1, battery 110, power control unit 120, electronic control unit 130, differential device 140, drive wheels 150, and so forth.

The rotating electric machine 1 is a three-phase alternate-current (AC) rotating electric machine, for example. The rotating electric machine 1 functions as an electric motor that delivers driving force for driving the drive wheels 150 via the differential device 140, using electric power supplied from the battery 110 via the power control unit 120. The rotating electric machine 1 also functions as a generator that generates electric power during braking of the electric vehicle 100. The power generated by the rotating electric machine 1 is supplied to the battery 110 via the power control unit 120. Thus, the rotating electric machine 1 of the first embodiment is a so-called motor-generator.

The battery 110 is a power storage device in the form of a secondary battery, such as a nickel hydride battery, or a lithium-ion battery. The battery 110 can be charged with electric power generated by the rotating electric machine 1, and can also be charged with electric power supplied from an external power supply. The battery 110 is not limited to the secondary battery, but may be a power storage device, such as a capacitor, which can generate direct-current (DC) voltage, and is also rechargeable.

The power control unit 120 has a function of converting DC power supplied from the battery 110 into AC power and supplying the AC power to the rotating electric machine 1, and a function of converting AC power generated by the rotating electric machine 1 into DC power and supplying the DC power to the battery 110.

The electronic control unit 130 principally consists of a central processing unit (CPU), random access memory (RAM), read-only memory (ROM), and so forth, and controls the rotating electric machine 1 by controlling the power control unit 120 and adjusting the amount of electric power supplied from the battery 110 to the rotating electric machine 1, for example.

The rotating electric machine 1 according to the first embodiment may be used in a hybrid vehicle having an engine and a rotating electric machine, for example.

Figure 2:
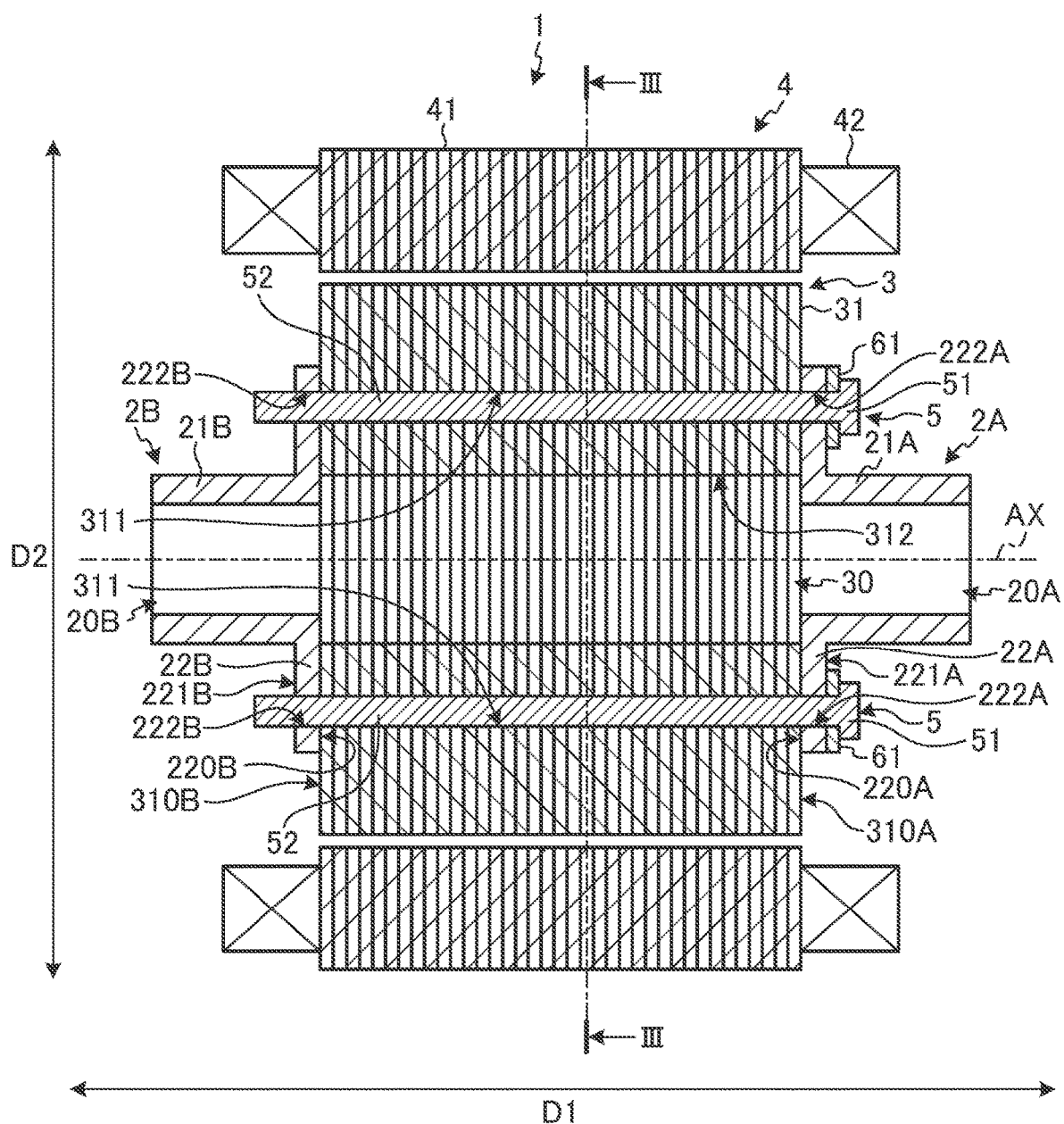
FIG. 2 is a cross-sectional view taken along the axis of the rotating electric machine according to the first embodiment.
Figure 3:
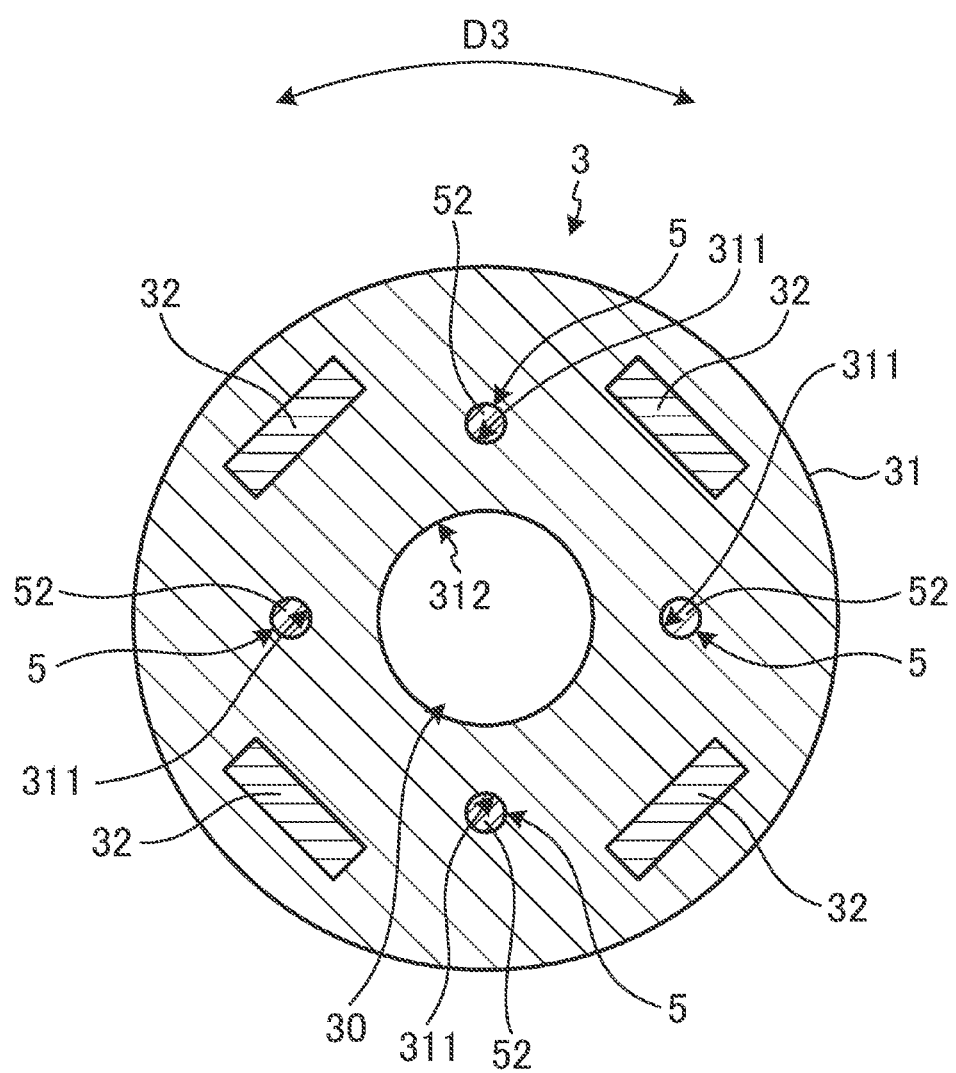
FIG. 3 is a cross-sectional view of a rotor in a III-III section in FIG. 2.

FIG. 2 is a cross-sectional view taken along the axis AX of the rotating electric machine 1 according to the first embodiment. FIG. 3 is a cross-sectional view of a rotor 3 in a III-III section in FIG. 2.

As shown in FIG. 2, the rotating electric machine 1 according to the first embodiment includes a first shaft 2A, second shaft 2B, rotor 3, stator 4, bolts 5, washers 61, and so forth.

Each of the first shaft 2A and the second shaft 2B is a rotating shaft member that is made of metal, extends in an axial direction D1, and is rotatable about the axis AX. In the following description, the "axial direction D1" is defined as the axial direction (longitudinal direction) of the first shaft 2A and second shaft 2B.

The first shaft 2A as a first rotating shaft member has a first through-hole 20A as a first shaft member through-hole formed on the same axis as the axis AX, first shaft portion 21A, and first flange portion 22A. The first shaft portion 21A, which is cylindrical, extends in the axial direction D1, and can rotate about the axis AX. The first flange portion 22A is an annular portion that protrudes from an outer circumferential surface of the first shaft portion 21A in radial directions D2. The first flange portion 22A has a first contact face 220A that contacts with an end face 310A at one end of a rotor core 31 (which will be described later) of the rotor 3 as viewed in the axial direction D1. The first shaft portion 21A is integrally connected to a face 221A of the first flange portion 22A opposite to the first contact face 220A. Also, the first flange portion 22A is provided with a plurality of first through-holes 222A that extends through the first flange portion 22A in the axial direction D1, and shaft portions 52 of the bolts 5 are inserted through the first through-holes 222A. In this embodiment, four first through-holes 222A having the same number as the bolts 5 are formed at intervals of 90° in a circumferential direction D3 of the first flange portion 22A.

The second shaft 2B as a second rotating shaft member has a second through-hole 20B as a second shaft member through-hole formed through the second shaft 2B on the same axis as the axis AX, second shaft portion 21B, and second flange portion 22B. The second shaft portion 21B, which is cylindrical, extends in the axial direction D1, and can rotate about the axis AX. The second flange portion 22B is an annular portion that protrudes from an outer circumferential surface of the second shaft portion 21B in the radial directions D2. The second flange portion 22B has a second contact face 220B that contacts with an end face 310B at the other end of the rotor core 31 as viewed in the axial direction D1. The second shaft portion 21B is integrally connected to a face 221B of the second flange portion 22B opposite to the second contact face 220B. Also, the second flange portion 22B is provided with a plurality of second through-holes 222B that extends through the second flange portion 22B in the axial direction D1, and the shaft portions 52 of the bolts 5 as fastening members that constitute a fastening device are inserted through the second through-holes 222B. In this embodiment, four second through-holes 222B having the same number as the bolts 5 are formed at intervals of 90° in the circumferential direction D3 of the second flange portion 22B. Also, female screws that engage with male screws formed on distal end portions of the shaft portions 52 of the bolts 5 are formed on inner circumferential walls of the four second through-holes 222B.

While the outside diameter of the first flange portion 22A and the second flange portion 22B is smaller than the outside diameter of the rotor core 31 in this embodiment, it may be equal to the outside diameter of the rotor core 31.

As shown in FIG. 3, the rotor 3 has the rotor core 31, four permanent magnets 32, and so forth. The rotor core 31 is formed in a cylindrical shape, by stacking a plurality of annular electromagnetic steel sheets in the axial direction D1, and has a through-hole 30 as a core through-hole formed on the same axis as the axis AX. The through-hole 30 of the rotor core 31 communicates with the first through-hole 20A of the first shaft 2A, and the second through-hole 20B of the second shaft 2B. The diameter of the through-hole 30 is larger than that of the first through-hole 20A and second through-hole 20B. The rotor core 31 has clearances between the electromagnetic steel sheets in the axial direction D1; therefore, the magnetic resistance in the axial direction D1 is larger than that in the radial directions D2 perpendicular to the axial direction D1 of the rotor core 31, and that in the circumferential direction D3 of the rotor core 31. Thus, in the rotor core 31, magnetic flux is less likely to travel in the axial direction D1, and is more likely to travel in the radial directions D2. The four permanent magnets 32 are arranged at intervals of 90° in the circumferential direction D3 of the rotor core 31, in a radially outer portion of the rotor core 31, and are embedded in the rotor core 31 while extending in the axial direction D1. Opposite end faces of the four permanent magnets 32 in the axial direction D1 are substantially flush with the opposite end faces 310A, 310B of the rotor core 31 in the axial direction D1. Also, the rotor core 31 is provided with four through-holes 311 as bolt through-holes formed through the rotor core 31 in the axial direction D1, and the shaft portions 52 of the bolts 5 are inserted through the through-holes 311. In this embodiment, the four through-holes 311 are provided at intervals of 90° in the circumferential direction D3, between adjacent ones of the permanent magnets 32 in the circumferential direction D3. In this embodiment, four first through-holes 222A of the first flange portion 22A and four second through-holes 222B of the second flange portion 22B are provided at positions corresponding to the positions of the four through-holes 311 of the rotor core 31.

Referring back to FIG. 2, the stator 4 has a cylindrical stator core 41 that is placed outwardly of the rotor core 31 in the radial directions D2 with a given spacing from the rotor core 31, and a stator coil 42 wound around the stator core 41. The stator core 41 is formed by stacking a plurality of electromagnetic steel sheets in the axial direction D1. The stator core 41 has clearances between the electromagnetic steel sheets in the axial direction D1; therefore, the magnetic resistance in the axial direction D1 is larger than those in the radial directions D2 and circumferential direction D3. Thus, in the stator core 41, magnetic flux is less likely to travel in the axial direction D1, and is more likely to travel in the radial directions D2.

In this embodiment, cooling oil is supplied to the rotating electric machine 1 by means of an oil pump (not shown), or the like, so that the rotor 3 and the stator 4 are cooled.

Each of the bolts 5 is made of metal, and has a head portion 51 and a shaft portion 52. The head portion 51 has a larger outside dimension as measured in the radial directions D2 than that of the shaft portion 52. The head portion 51 protrudes on the face 221A side of the first flange portion 22A, without extending through the first through-hole 222A of the first flange portion 22A. The shaft portion 52 extends from the head portion 51 in the axial direction D1. The shaft portion 52 has a smaller outside diameter than those of the first through-hole 222A of the first flange portion 22A, the through-hole 311 of the rotor core 31, and the second through-hole 222B of the second flange portion 22B. The male screw that is engaged with the female screw formed on the inner circumferential wall of the second through-hole 222B is formed on an outer circumferential surface of a distal end portion of the shaft portion 52. Then, the bolt 5 is mounted in position, such that the shaft portion 52 is inserted through the first through-hole 222A of the first flange portion 22A, the through-hole 311 of the rotor core 31, and the second through-hole 222B of the second flange portion 22B, from the first shaft 2A side in the axial direction D1, and the male screw of the shaft portion 52 is engaged with the female screw formed in the second through-hole 222B.

In the rotating electric machine 1 according to the first embodiment, a female screw may be formed on an inner circumferential wall of the first through-hole 222A of the first flange portion 22A, and the shaft portion 52 of the bolt 5 may be inserted through the second through-hole 222B of the second flange portion 22B, the through-hole 311 of the rotor core 31, and the first through-hole 222A of the first flange portion 22A, from the second shaft 2B side in the axial direction D1, so that the male screw of the shaft portion 52 is engaged with the female screw formed in the first through-hole 222A.

Figure 4:
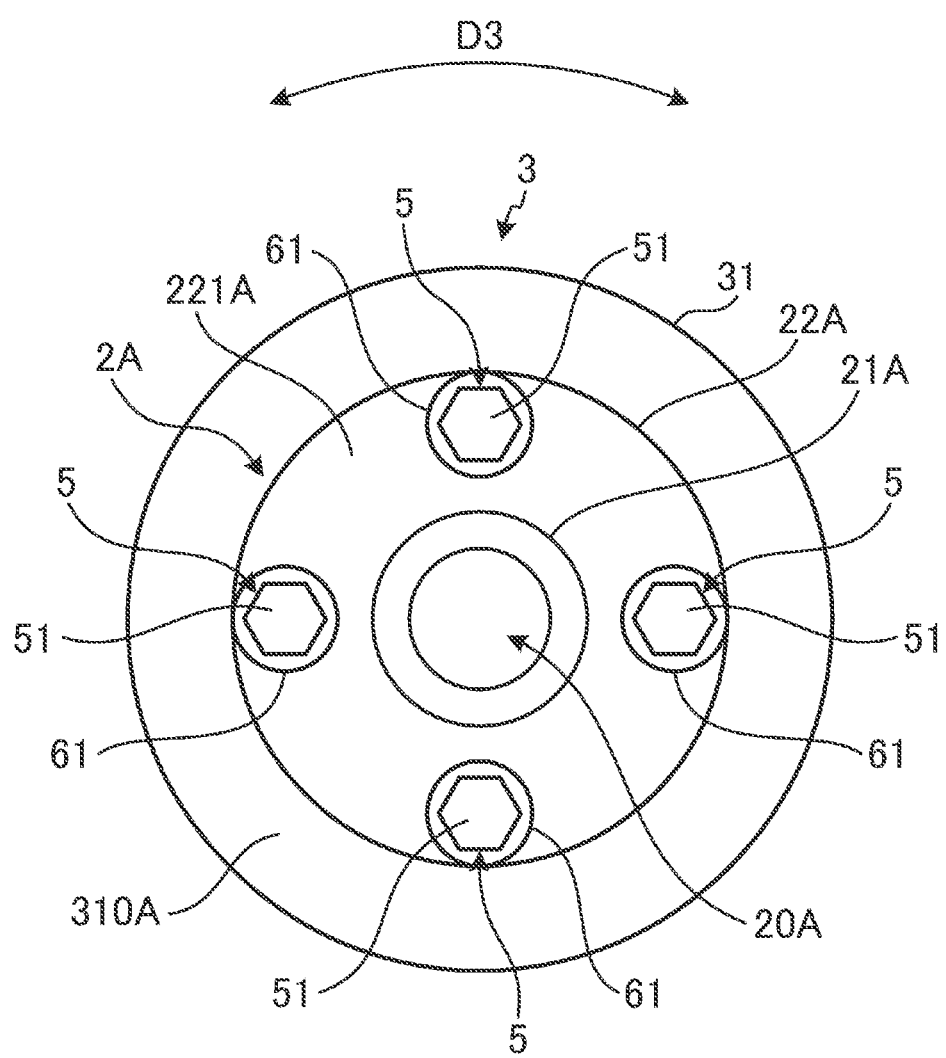
FIG. 4 is a view of a rotor as seen from the first shaft side in the axial direction.
Figure 5:
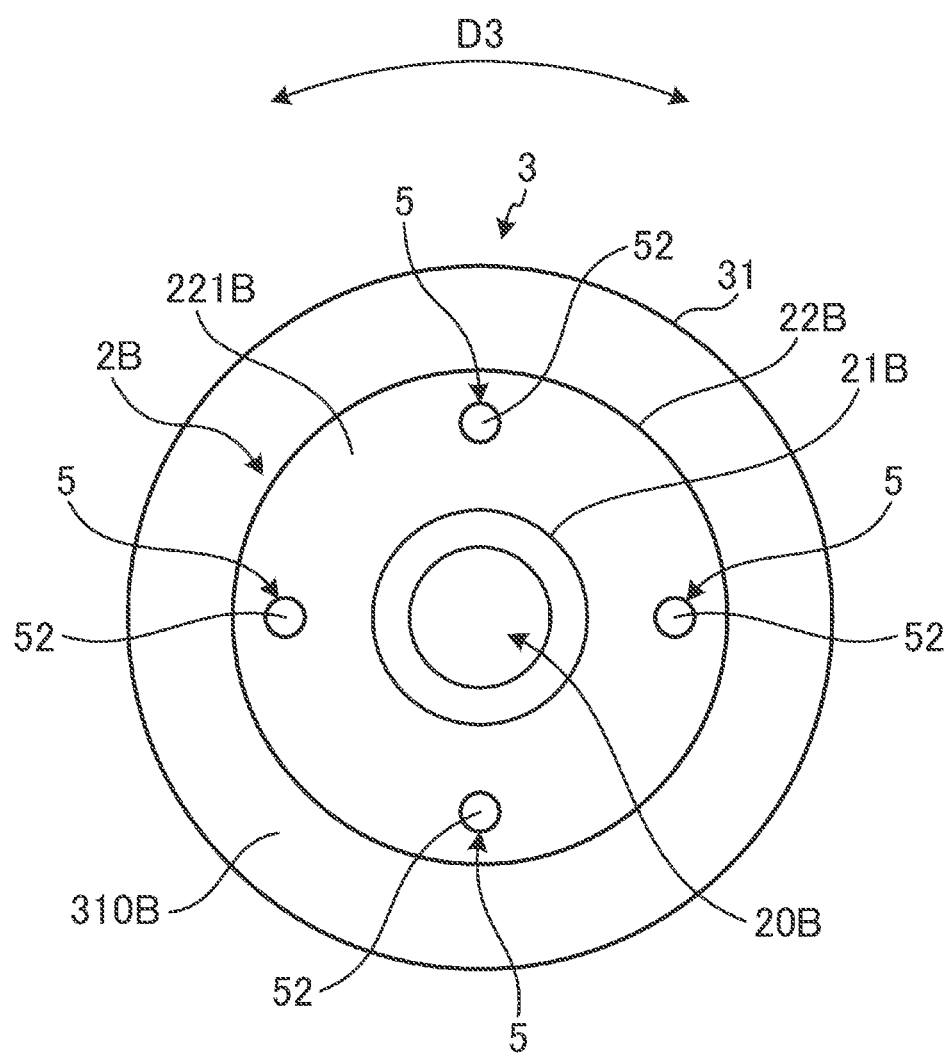
FIG. 5 is a view of the rotor as seen from the second shaft side in the axial direction.

The washers 61 have an annular shape, and the shaft portions 52 of the bolts 5 are inserted through the washers 61. As shown in FIG. 1 and FIG. 4, each of the washers 61 is placed between the head portion 51 of the corresponding bolt 5 and the first flange portion 22A of the first shaft 2A. In this connection, it is not essential to use the washers 61, but the washers 61 may not be provided.

The rotating electric machine 1 according to the first embodiment has four bolts 5 as the fastening members of the fastening device, and the first shaft 2A and the second shaft 2B are fastened by the four bolts 5, in a condition where the rotor core 31 is sandwiched between the first flange portion 22A of the first shaft 2A and the second flange portion 22B of the second shaft 2B, from the opposite sides of the rotor core 31 in the axial direction D1. As a result, the first shaft 2A, second shaft 2B and rotor core 31 are fixed by the four bolts 5, etc., such that they can rotate as a unit. Thus, in the rotating electric machine 1 of the first embodiment, it is possible to easily fix the first shaft 2A and the second shaft 2B to the rotor core 31, without causing the first shaft 2A and the second shaft 2B to be inserted into and fitted in the shaft hole of the rotor core 31 by shrinkage fitting or press fitting, or joining the first shaft 2A and the second shaft 2B to the rotor core 31 by laser welding. Thus, assembling of the rotating electric machine 1 is simplified, which may lead to reduction of the cost.

In the rotating electric machine 1 according to the first embodiment, the first shaft 2A and the second shaft 2B are fastened by use of four bolts 5; therefore, larger shaft force is obtained, and the shafts 2A, 2B can be firmly fixed to the rotor core 31, as compared with the case where a single shaft having a larger length in the axial direction D1 than the rotor core 31 is inserted into and fixed to the rotor core 31. Also, since each of the first shaft 2A and the second shaft 2B is shorter than the single shaft, the shafts 2A, 2B can be easily worked, which may lead to reduction of the cost and reduction of the weight.

Also, in the rotating electric machine 1 according to the first embodiment, there is no need to additionally provide the first shaft 2A and second shaft 2B, and the rotor core 31, with a locking mechanism (such as key grooves) for preventing the first shaft 2A and second shaft 2B from rotating relative to the rotor core 31. Thus, work for the locking mechanism is not needed, and the cost can be reduced.

Also, the inside diameter of the rotor core 31 can be reduced, which makes it possible to reduce the outside diameter of the rotor core 31 accordingly, while assuring desired magnetic characteristics, which may lead to reduction of the size of the rotor 3, and, consequently, reduction of the size of the rotating electric machine 1.

Second Embodiment

A rotating electric machine as a second embodiment of the disclosure will be described. Description of portions common to the rotating electric machine 1 of the first embodiment and that of the second embodiment will be omitted as appropriate. The rotating electric machine of the second embodiment is used in the electric vehicle 100, for example, like the rotating electric machine 1 of the first embodiment.

Figure 6:
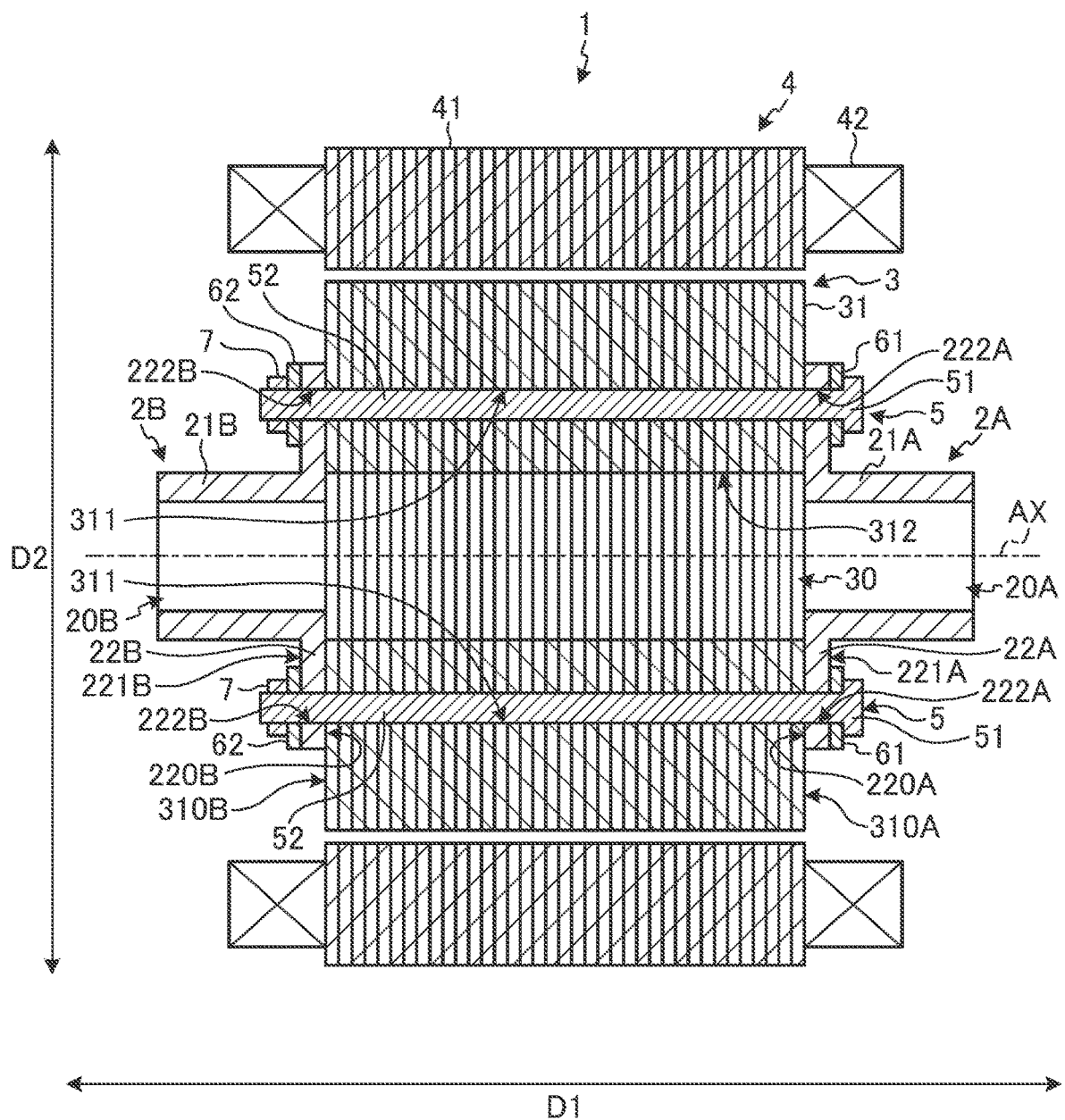
FIG. 6 is a cross-sectional view taken along the axis of a rotating electric machine according to a second embodiment.
Figure 7:
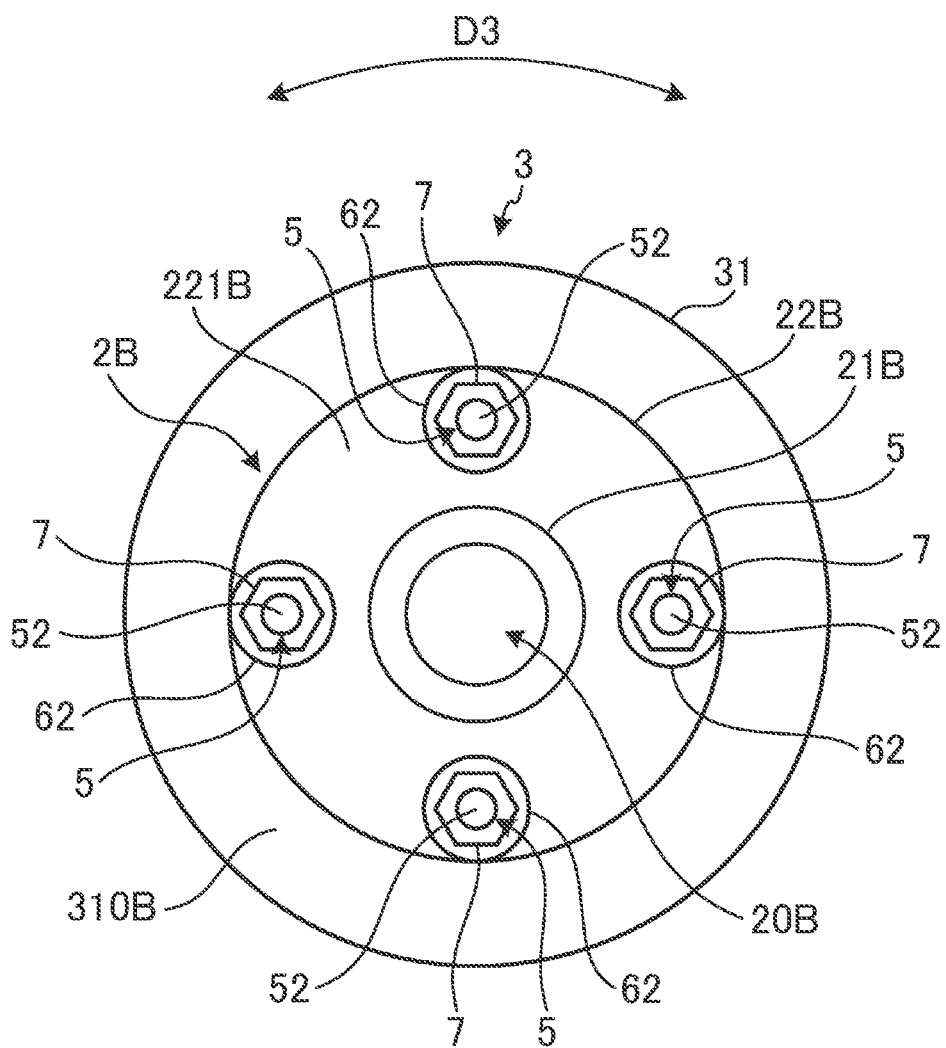
FIG. 7 is a view of a rotor as seen from the second shaft side in the axial direction.

FIG. 6 is a cross-sectional view taken along the axis AX of the rotating electric machine 1 according to the second embodiment. FIG. 7 is a view of the rotor 3 as seen from the second shaft 2B side in the axial direction D1.

The rotating electric machine 1 according to the second embodiment has four bolts 5 and four nuts 7, as fastening members of the fastening device that fastens the first shaft 2A and the second shaft 2B, in a condition where the rotor core 31 is sandwiched between the first flange portion 22A and the second flange portion 22B.

Each bolt 5 has a male screw formed on a distal end portion of the shaft portion 52 (opposite to the head portion 51 side of the shaft portion 52), and a portion of the male screw which protrudes outward from the face 221B of the second flange portion 22B is engaged with the corresponding one of the nuts 7.

The shaft portions 52 of the bolts 5 are inserted through washers 62 having an annular shape. As shown in FIG. 6 and FIG. 7, the washers 62 are placed between the shaft portions 52 of the bolts 5 and the second flange portion 22B of the second shaft 2B. The use of the washers 62 is not essential, but may be omitted.

In the rotating electric machine 1 according to the second embodiment, the first shaft 2A and the second shaft 2B are fastened by use of the four bolts 5 and four nuts 7, in a condition where the rotor core 31 is sandwiched between the first flange portion 22A and the second flange portion 22B, from the opposite sides of the rotor core 31 in the axial direction D1. As a result, the first shaft 2A and second shaft 2B are fixed to the rotor 3 by means of the four bolts 5, four nuts 7, etc. such that they can rotate as a unit. Thus, in the rotating electric machine 1 of the second embodiment, it is possible to easily fix the first shaft 2A and the second shaft 2B to the rotor core 31, without causing the first shaft 2A and the second shaft 2B to be inserted into and fitted in the shaft hole of the rotor core 31 by shrinkage fitting or press fitting, or joining the first shaft 2A and the second shaft 2B to the rotor core 31 by laser welding. Thus, assembling of the rotating electric machine 1 is simplified, which may lead to reduction of the cost.

In the rotating electric machine 1 according to the second embodiment, it is not necessary to form a female screw that engages with the male screw of the bolt 5, on the inner circumferential wall of the first through-hole 222A of the first flange portion 22A, or the inner circumferential wall of the second through-hole 222B of the second flange portion 22B, and the cost can be reduced. Also, common components can be used for the first shaft 2A and the second shaft 2B, which may lead to reduction of the cost.

Third Embodiment

In the following, a rotating electric machine as a third embodiment of the disclosure will be described. Description of portions common to the rotating electric machine 1 of the first embodiment and that of the third embodiment will be omitted as appropriate. The rotating electric machine of the third embodiment is used in the electric vehicle 100, for example, like the rotating electric machine 1 of the first embodiment.

Figure 8:
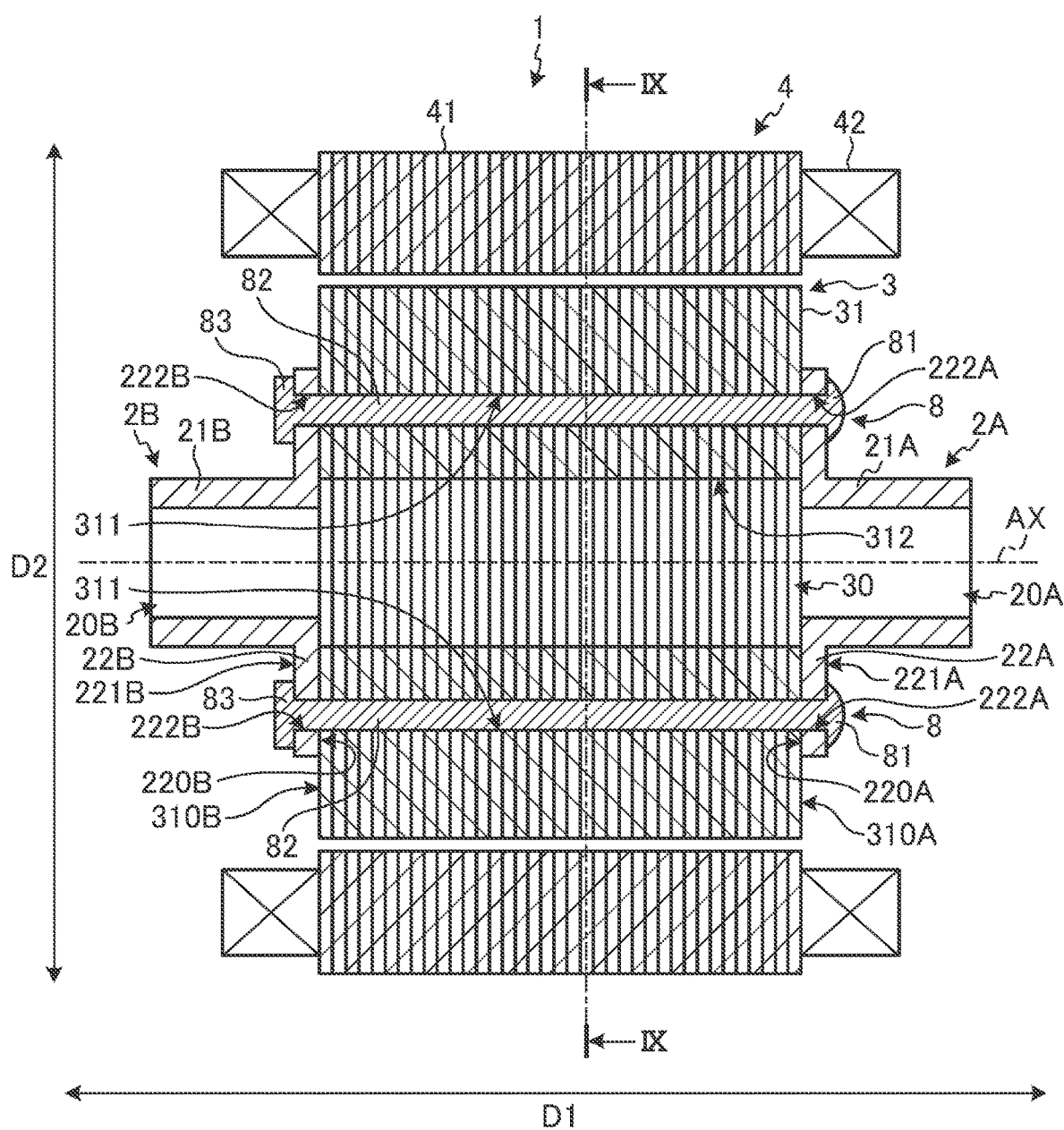
FIG. 8 is a cross-sectional view taken along the axis of a rotating electric machine according to a third embodiment.
Figure 9:
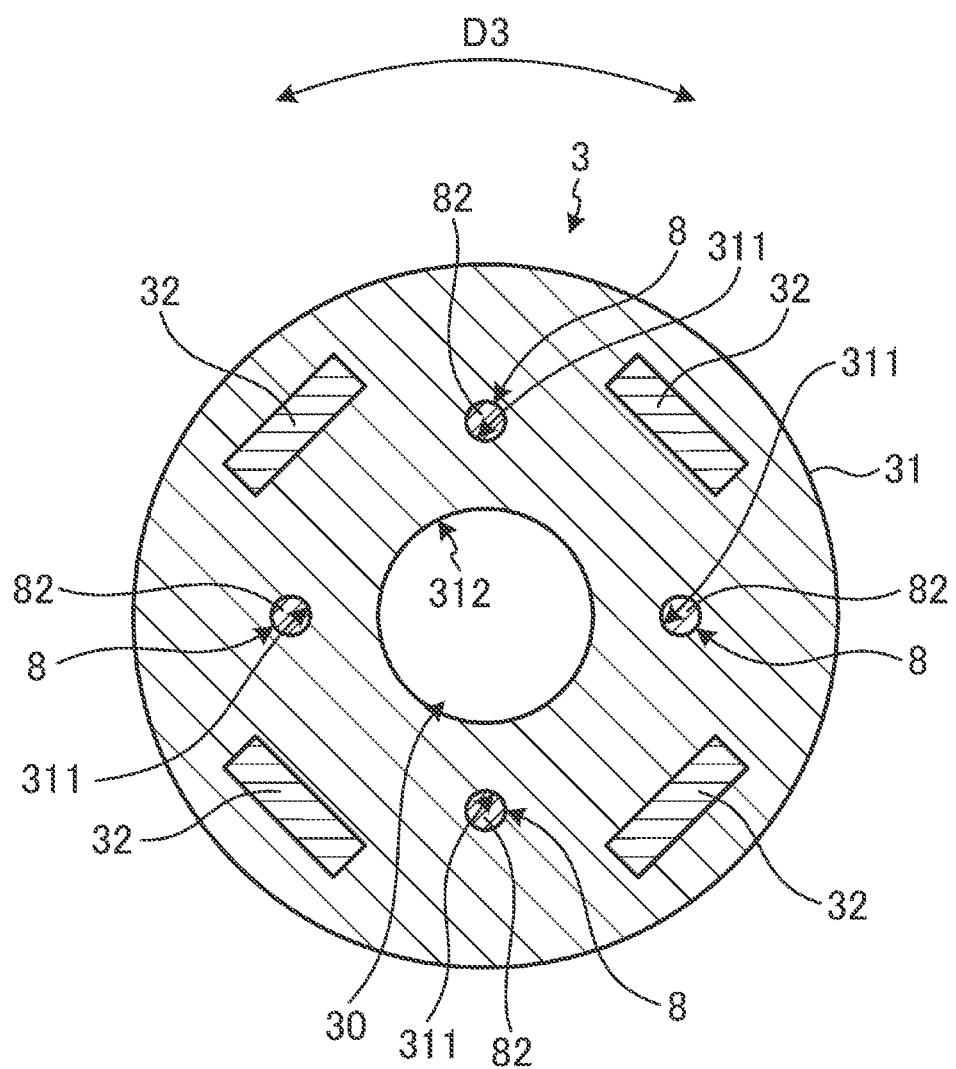
FIG. 9 is a cross-sectional view of a rotor in a IX-IX section in FIG. 8.
Figure 10:
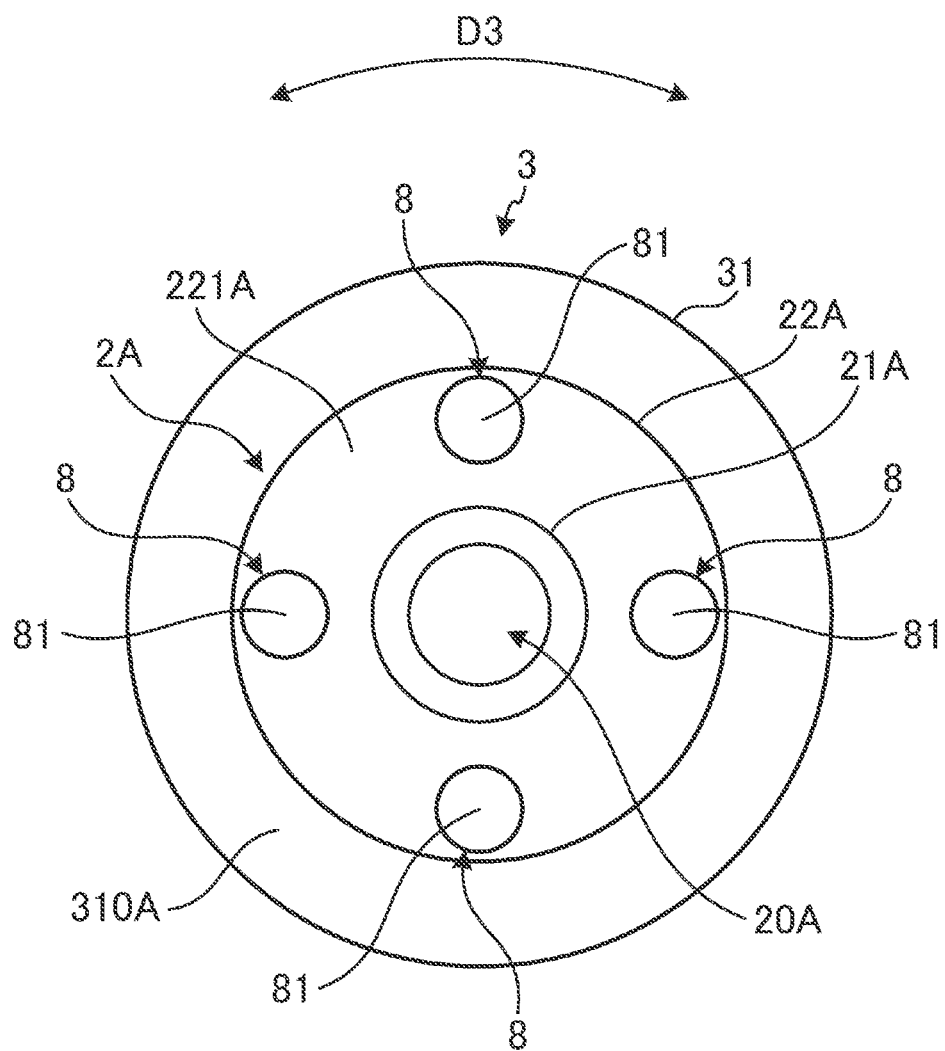
FIG. 10 is a view of the rotor as seen from the first shaft side in the axial direction.
Figure 11:
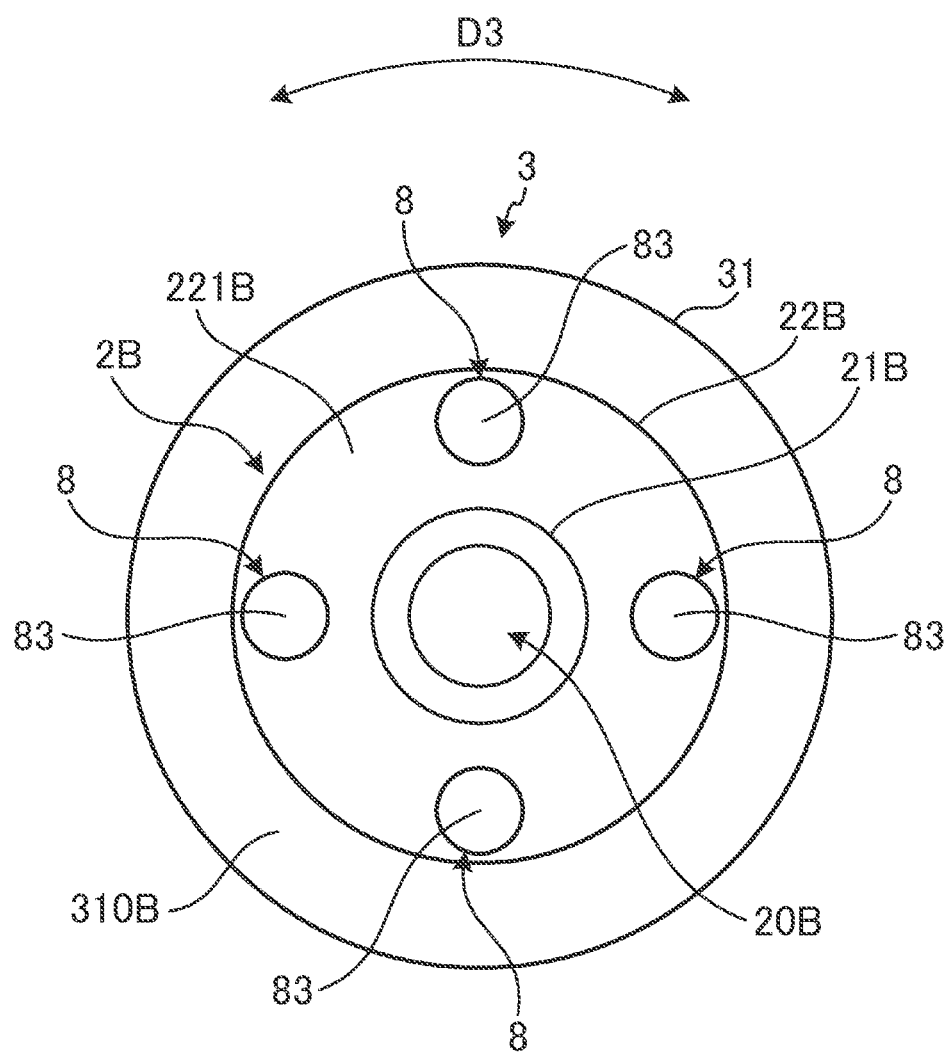
FIG. 11 is a view of the rotor as seen from the second shaft side in the axial direction.

FIG. 8 is a cross-sectional view taken along the axis AX of the rotating electric machine 1 according to the third embodiment. FIG. 9 is a cross-sectional view of the rotor 3 in a IX-IX section in FIG. 8. FIG. 10 is a view of the rotor 3 as seen from the first shaft 2A side in the axial direction D1. FIG. 11 is a view of the rotor 3 as seen from the second shaft 2B side in the axial direction D1.

The rotating electric machine 1 according to the third embodiment has four rivets 8, as fastening members of the fastening device that fastens the first shaft 2A and the second shaft 2B, in a condition where the rotor core 31 is sandwiched between the first flange portion 22A and the second flange portion 22B, from the opposite sides of the rotor core 31 in the axial direction D1.

Each of the rivets 8 made of metal has a head portion 81 and a shaft portion 82, and includes a pressed portion 83 formed by pressing or hammering a distal end portion of the shaft portion 82 (an end portion of the shaft portion 82 opposite to the head portion 81). The shape of the head portion 81 of the rivet 8 is not limited to a round (semispherical) head as shown in FIG. 8, but may be a flat (disc-like) head or a dish head (which has a flat surface and a conical base). The head portion 81 has a larger outer dimension in the radial directions D2 that that of the shaft portion 82. The head portion 81 does not extend through the first through-hole 222A of the first flange portion 22A, but protrudes from the face 221A of the first flange portion 22A. The shaft portion 82 extends from the head portion 81 in the axial direction D1. The shaft portion 82 has an outside diameter that is smaller than those of the first through-hole 222A of the first flange portion 22A, through-hole 311 as a rivet through-hole of the rotor core 31, and the second through-hole 222B of the second flange portion 22B. Then, the rivet 8 is inserted, from the first shaft 2A side in the axial direction D1, into the first through-hole 222A of the first flange portion 22A, through-hole 311 of the rotor core 31, and the second through-hole 222B of the second flange portion 22B. Then, at the distal end of the shaft portion 82 of the rivet 8, a portion of the rivet 8 which protrudes outward from the face 221B of the second flange portion 22B is pressed, to form the pressed portion 83. The pressed portion 83 has a larger dimension than the outside diameter of the shaft portion 82 in the radial directions D2.

In the rotating electric machine 1 according to the third embodiment, the first shaft 2A and the second shaft 2B are fastened by the four rivets 8, in a condition where the rotor core 31 is sandwiched between the first flange portion 22A and the second flange portion 22B. As a result, the first shaft 2A and second shaft 2B are fixed to the rotor 3 with the four rivets 8, such that the shafts 2A, 2B and rotor 3 can rotate as a unit. Thus, in the rotating electric machine 1 of the third embodiment, it is possible to easily fix the first shaft 2A and the second shaft 2B to the rotor core 31, without causing the first shaft 2A and the second shaft 2B to be inserted into and fitted in the shaft hole of the rotor core 31 by shrinkage fitting or press fitting, or joining the first shaft 2A and the second shaft 2B to the rotor core 31 by laser welding. Thus, assembling of the rotating electric machine 1 is simplified, which may lead to reduction of the cost.

In the rotating electric machine 1 of the third embodiment, the rivets 8 are used as the fastening members of the fastening device for fastening the first shaft 2A and the second shaft 2B. This makes it unnecessary to form a female screw on the inner circumferential wall of the first throughhole 222A or the inner circumferential wall of the second through-hole 222B, or additionally provide the nuts 7, which may lead to reduction of the processing cost and the number of components, and reduction of the cost.

Fourth Embodiment

In the following, a rotating electric machine as a fourth embodiment of the disclosure will be described. Description of portions common to the rotating electric machine 1 of the first embodiment and that of the fourth embodiment will be omitted as appropriate. The rotating electric machine according to the fourth embodiment is used in the electric vehicle 100, for example, like the rotating electric machine 1 of the first embodiment.

Figure 12:
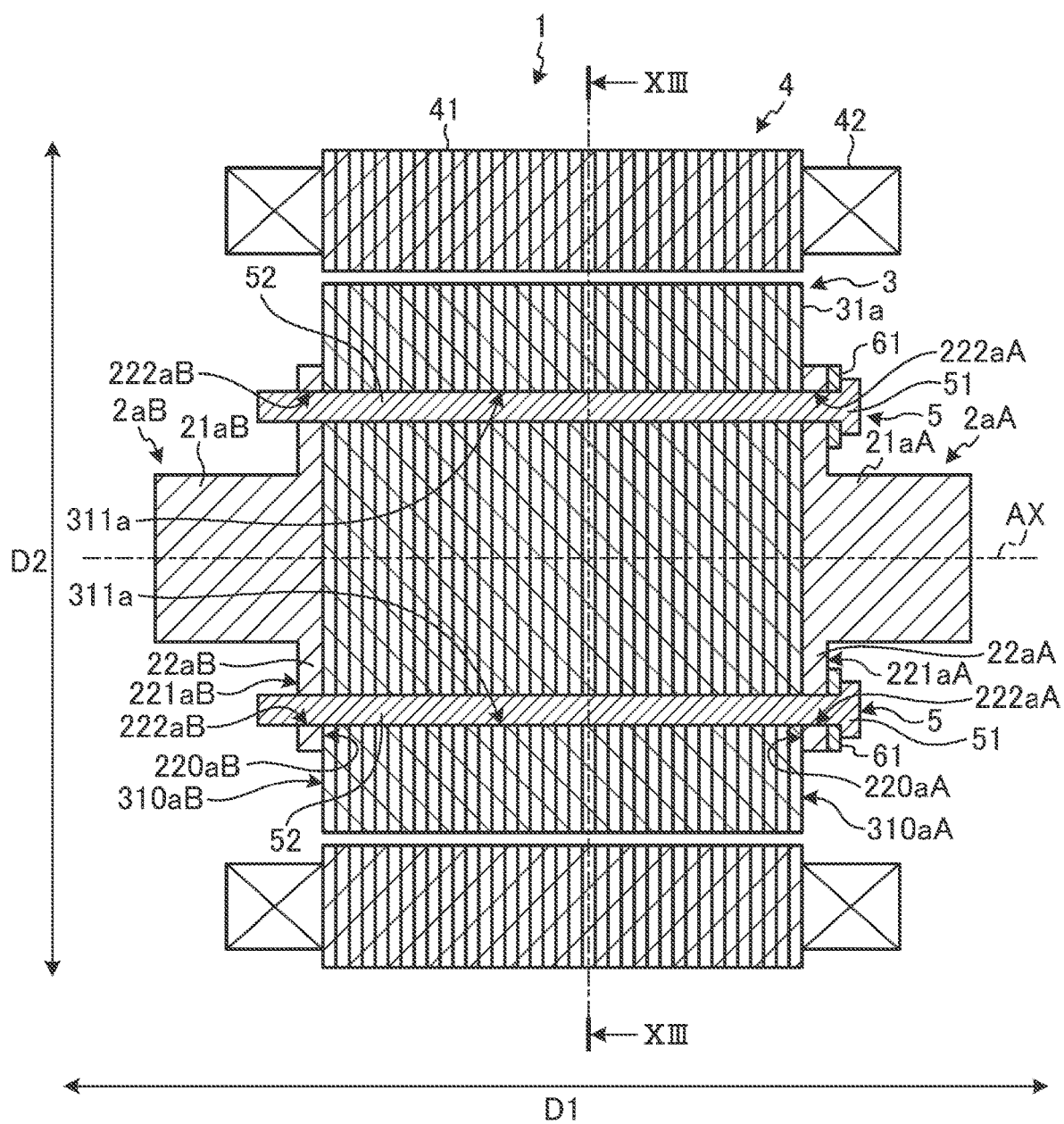
FIG. 12 is a cross-sectional view taken along the axis of a rotating electric machine according to a fourth embodiment.
Figure 13:
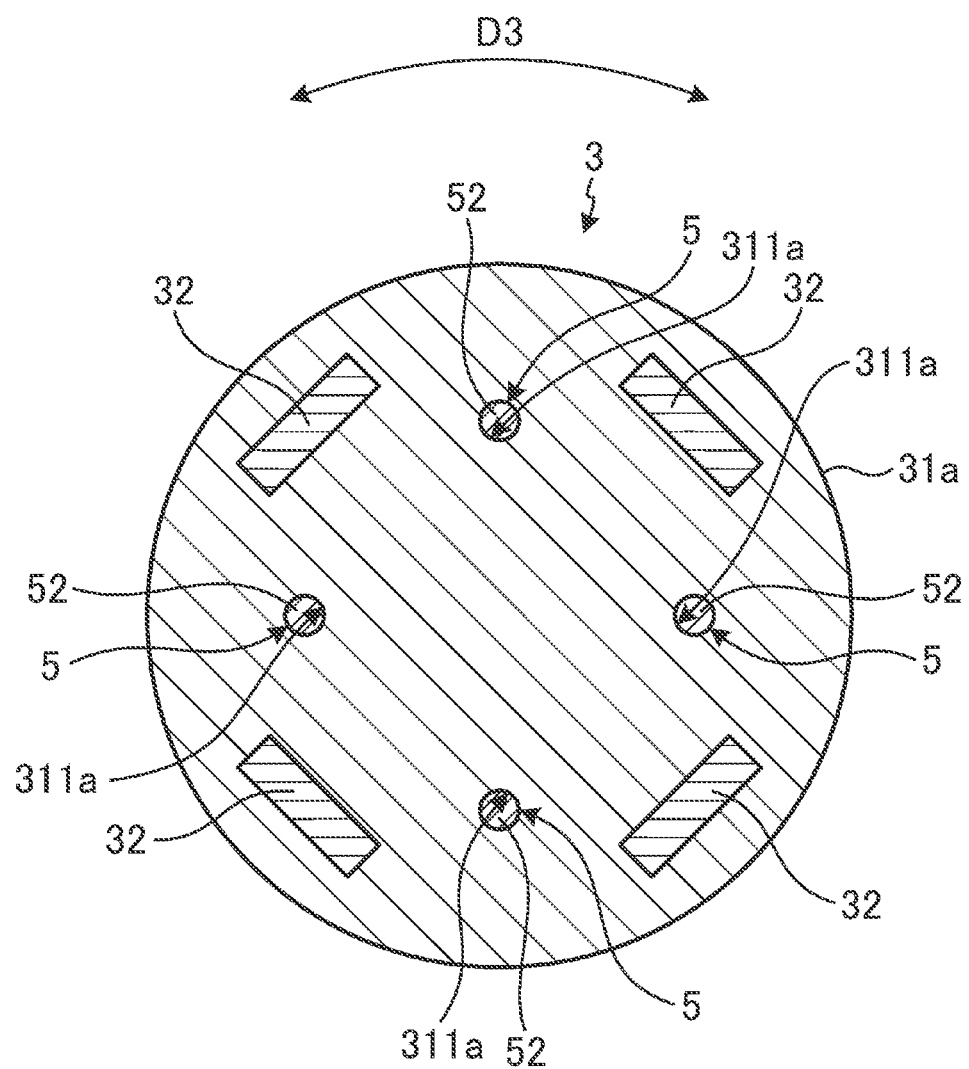
FIG. 13 is a cross-sectional view of a rotor in a XIII-XIII section in FIG. 12.

FIG. 12 is a cross-sectional view taken along the axis AX of the rotating electric machine 1 according to the fourth embodiment. FIG. 13 is a cross-sectional view of the rotor 3 in a XIII-XIII section in FIG. 12.

As shown in FIG. 12 and FIG. 13, in the rotating electric machine 1 according to the fourth embodiment, a rotor core 31a of the rotor 3 is solid, and is formed in a cylindrical shape by stacking a plurality of disk-shaped electromagnetic steel sheets in the axial direction D1. The rotor core 31a is also provided with through-holes 311a as four bolt insertion holes that extend through the rotor core 31a in the axial direction D1, and the shaft portions 52 of the bolts 5 are inserted through the through-holes 311a. The four throughholes 311a are arranged at intervals of 90° in the circumferential direction D3 of the rotor core 31a.

In the rotating electric machine 1 according to the fourth embodiment, a first shaft 2aA is solid, and has a cylindrical first shaft portion 21aA, and a disk-shaped first flange portion 22aA. The first shaft portion 21aA is elongate in the axial direction D1, and can rotate about the axis AX. The first flange portion 22aA protrudes in the radial directions D2 from the outer circumferential surface of the first shaft portion 21aA, and has a first contact face 220aA that contacts with an end face 310aA of the rotor core 31a on one side in the axial direction D1. The first shaft portion 21aA is integrally connected to a face 221aA of the first flange portion 22aA opposite to the first contact face 220aA.

In the first flange portion 22aA, four first through-holes 222aA formed through the first flange portion 22aA in the axial direction D1 are provided at intervals of 90° in the circumferential direction D3, at positions corresponding to the positions of the four through-holes 311a of the rotor core 31a, and the shaft portions 52 of the bolts 5 are inserted through the first through-holes 222aA.

In the rotating electric machine 1 according to the fourth embodiment, a second shaft 2aB is solid, and has a cylindrical second shaft portion 21aB, and a disk-shaped second flange portion 22aB. The second shaft portion 21aB is elongate in the axial direction D1, and can rotate about the axis AX. The second flange portion 22aB protrudes in the radial directions D2 from the outer circumferential surface of the second shaft portion 21aB, and has a second contact face 220aB that contacts with an end face 310aB of the rotor core 31a on the other side in the axial direction D1. The second shaft portion 21aB is integrally connected to a face 221aB of the second flange portion 22aB opposite to the second contact face 220aB.

In the second flange portion 22aB, four second through-holes 222aB formed through the second flange portion 22aB in the axial direction D1 are provided at intervals of 90° in the circumferential direction D3, at positions corresponding to the positions of the four through-holes 311a of the rotor core 31a, and the shaft portions 52 of the bolts 5 are inserted through the second through-holes 222aB. Also, female screws that engage with male screws formed on distal end portions of the shaft portions 52 of the bolts 5 are formed on inner circumferential walls of the four second through-holes 222aB. Then, the shaft portions 52 of the bolts 5 are inserted, from the first shaft 2aA side in the axial direction D1, through the first through-holes 222aA of the first flange portion 22aA, through-holes 311a of the rotor core 31a, and the second through-holes 222aB of the second flange portion 22aB, and the male screws of the shaft portions 52 are engaged with the female screws formed in the second through-holes 222aB.

As shown in FIG. 12, the washers 61 are placed between the head portions 51 of the bolts 5 and the first flange portion 22aA of the first shaft 2aA. It is to be understood that the use of the washers 61 is not essential, but may be omitted.

In the rotating electric machine 1 according to the fourth embodiment, the first shaft 2aA and the second shaft 2aB are fastened by the four bolts 5, in a condition where the rotor core 31a is sandwiched between the first flange portion 22aA of the first shaft 2aA and the second flange portion 22aB of the second shaft 2aB, from the opposite sides of the rotor core 31a in the axial direction D1. As a result, the first shaft 2aA and the second shaft 2aB are fixed to the rotor core 31a with the four bolts 5, etc., such that the first shaft 2aA, second shaft 2aB, and rotor core 31a can rotate as a unit. Thus, in the rotating electric machine 1 of the fourth embodiment, it is possible to easily fix the first shaft 2aA and the second shaft 2aB to the rotor core 31a, without causing the first shaft 2aA and the second shaft 2aB to be inserted into and fitted in a shaft hole of the rotor core 31a by shrinkage fitting or press fitting, or joining the first shaft 2aA and the second shaft 2aB to the rotor core 31a by laser welding. Consequently, assembling of the rotating electric machine 1 is simplified, which may lead to reduction of the cost.

In the rotating electric machine 1 according to the fourth embodiment, the rotor core 31a, first shaft 2aA, and second shaft 2aB are solid; therefore, work for forming holes or bores to make the rotor core 31a, first shaft 2aA, and second shaft 2aB hollow is not needed, and the cost can be reduced.

Also, in the rotating electric machine 1 according to the fourth embodiment, since the rotor core 31a is solid, it is possible to reduce the outside diameter of the rotor core 31a while assuring desired magnetic characteristics, and reduce the size of the rotor 3, and consequently, the size of the rotating electric machine 1, as compared with the case where the rotor core 31a is hollow.

Fifth Embodiment

In the following, a rotating electric machine as a fifth embodiment of the disclosure will be described. Description of portions common to the rotating electric machine 1 of the first embodiment and that of the fifth embodiment will be omitted as appropriate. The rotating electric machine according to the fifth embodiment is used in the electric vehicle 100, for example, like the rotating electric machine 1 of the first embodiment.

Figure 14:
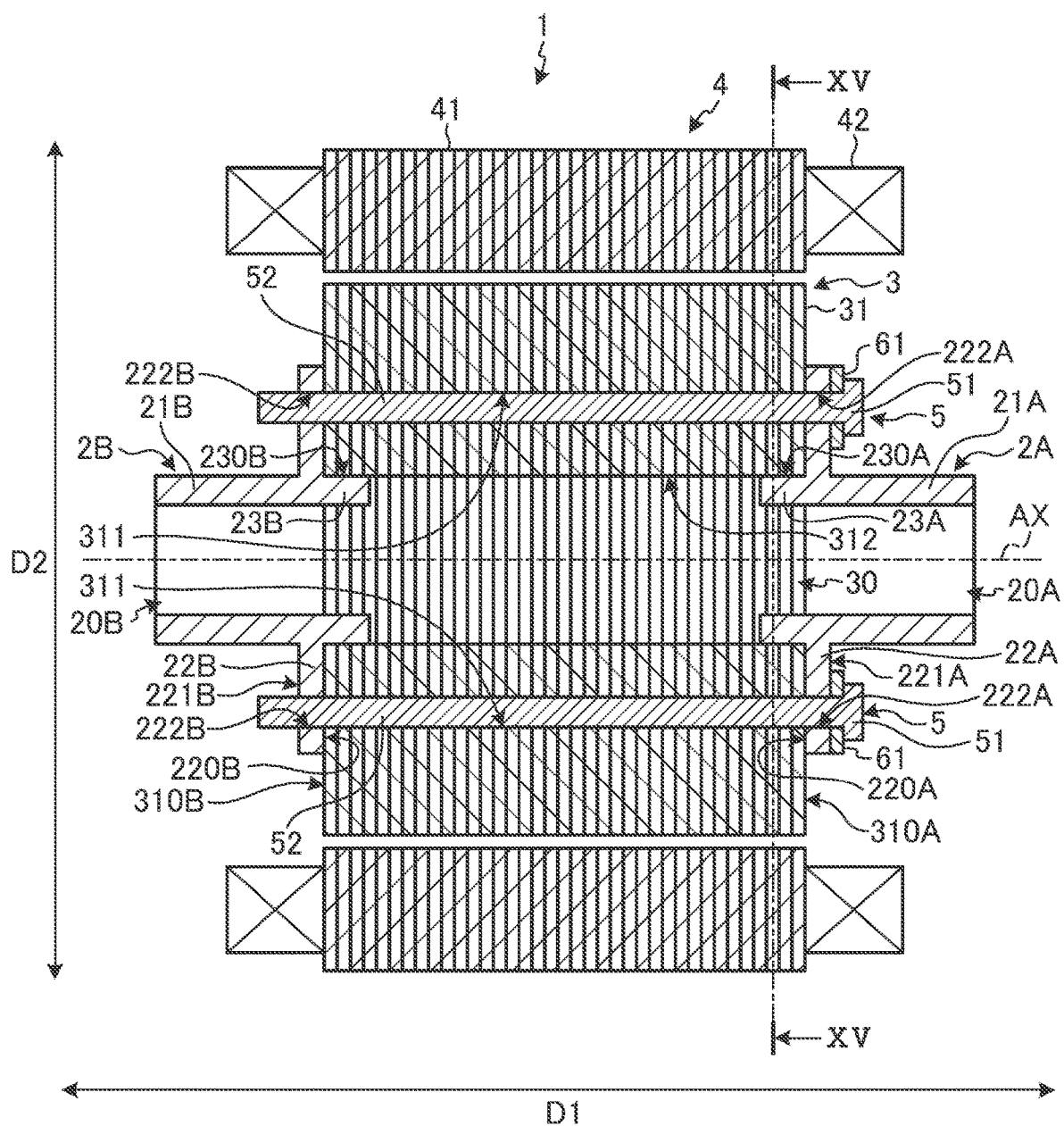
FIG. 14 is a cross-sectional view taken along the axis of a rotating electric machine according to a fifth embodiment.
Figure 15:
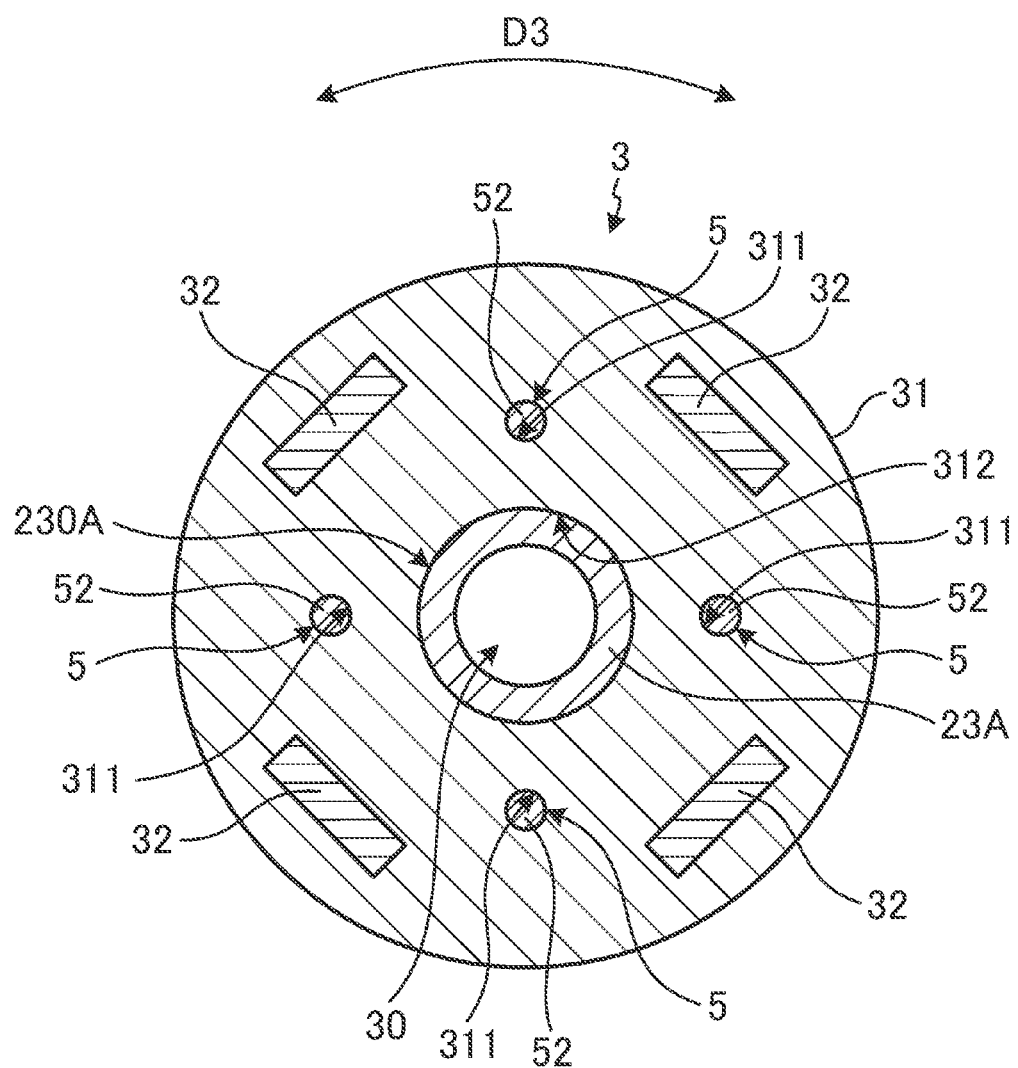
FIG. 15 is a cross-sectional view of a rotor in a XV-XV section in FIG. 14.

FIG. 14 is a cross-sectional view taken along the axis AX of the rotating electric machine 1 according to the fifth embodiment. FIG. 15 is a cross-sectional view of the rotor 3 in a XV-XV section in FIG. 14.

In the rotating electric machine 1 according to the fifth embodiment, a cylindrical first protruding portion 23A as a first fitted portion having the same axis as the first shaft portion 21A is integrally connected to the first contact face 220A of the first flange portion 22A of the first shaft 2A. Also, in the rotating electric machine 1 of the fifth embodiment, a cylindrical second protruding portion 23B as a second fitted portion having the same axis as the second shaft portion 21B is integrally connected to the second contact face 220B of the second flange portion 22B of the second shaft 2B. The length of each of the first protruding portion 23A and the second protruding portion 23B as measured in the axial direction D1 is shorter than one half of the length of the rotor core 31 as measured in the axial direction D1, and is set to a length that makes it possible to align the first shaft 2A and the second shaft 2B with the rotor core 31. Also, the outside diameter of the first protruding portion 23A and the second protruding portion 23B is substantially equal to the inside diameter of the rotor core 31.

In the rotating electric machine 1 according to the fifth embodiment, the first shaft 2A and the second shaft 2B are fastened by the four bolts 5, in a condition where the rotor core 31 is sandwiched between the first flange portion 22A and the second flange portion 22B. As a result, the first shaft 2A and the second shaft 2B are fixed to the rotor 3 with the four bolts 5, such that the first shaft 2A, second shaft 2B, and rotor 3 can rotate as a unit. Thus, in the rotating electric machine 1 of the fifth embodiment, it is possible to easily fix the first shaft 2A and the second shaft 2B to the rotor core 31, without causing the first shaft 2A and the second shaft 2B to be inserted into and fitted in the shaft hole of the rotor core 31 by shrinkage fitting or press fitting, or joining the first shaft 2A and the second shaft 2B to the rotor core 31 by laser welding. Consequently, assembling of the rotating electric machine 1 is simplified, which may lead to reduction of the cost.

In the rotating electric machine 1 according to the fifth embodiment, the first protruding portion 23A of the first shaft 2A and the second protruding portion 23B of the second shaft 2B are fitted in the through-hole 30 that functions as first and second fitting portions provided on the same axis as the axis AX of the rotor core 31, and an outer circumferential surface 230A of the first protruding portion 23A and an outer circumferential surface 230B of the second protruding portion 23B are respectively in contact with an inner circumferential surface 312 of the rotor core 31. With this arrangement, in the rotating electric machine 1 of the fifth embodiment, the first shaft 2A and the second shaft 2B are positioned relative to the rotor core 31, and the axis of the first shaft 2A and that of the second shaft 2B are aligned with each other with enhanced accuracy.

In the rotating electric machine 1 according to the fifth embodiment, the male screws formed on the shaft portions 52 of the bolts 5 are engaged with the female screws formed in the second through-holes 222B of the second flange portion 22B, so that the first shaft 2A and the second shaft 2B are fastened, as in the rotating electric machine 1 of the first embodiment. However, the manner of fastening the first shaft 2A and the second shaft 2B is not limited to this. For example, in the rotating electric machine 1 of the fifth embodiment, male screws formed on the shaft portions 52 of the bolts 5 may be engaged with the nuts 7, as in the rotating electric machine 1 of the second embodiment, so that the first shaft 2A and the second shaft 2B are fastened. Also, in the rotating electric machine 1 of the fifth embodiment, the first shaft 2A and the second shaft 2B may be fastened by use of the rivets 8, as in the rotating electric machine 1 of the third embodiment, for example.

Sixth Embodiment

In the following, a rotating electric machine as a sixth embodiment of the disclosure will be described. Description of portions common to the rotating electric machine 1 of the second embodiment and that of the sixth embodiment will be omitted as appropriate. The rotating electric machine of the sixth embodiment is used in the electric vehicle 100, for example, like the rotating electric machine 1 of the second embodiment.

Figure 16:
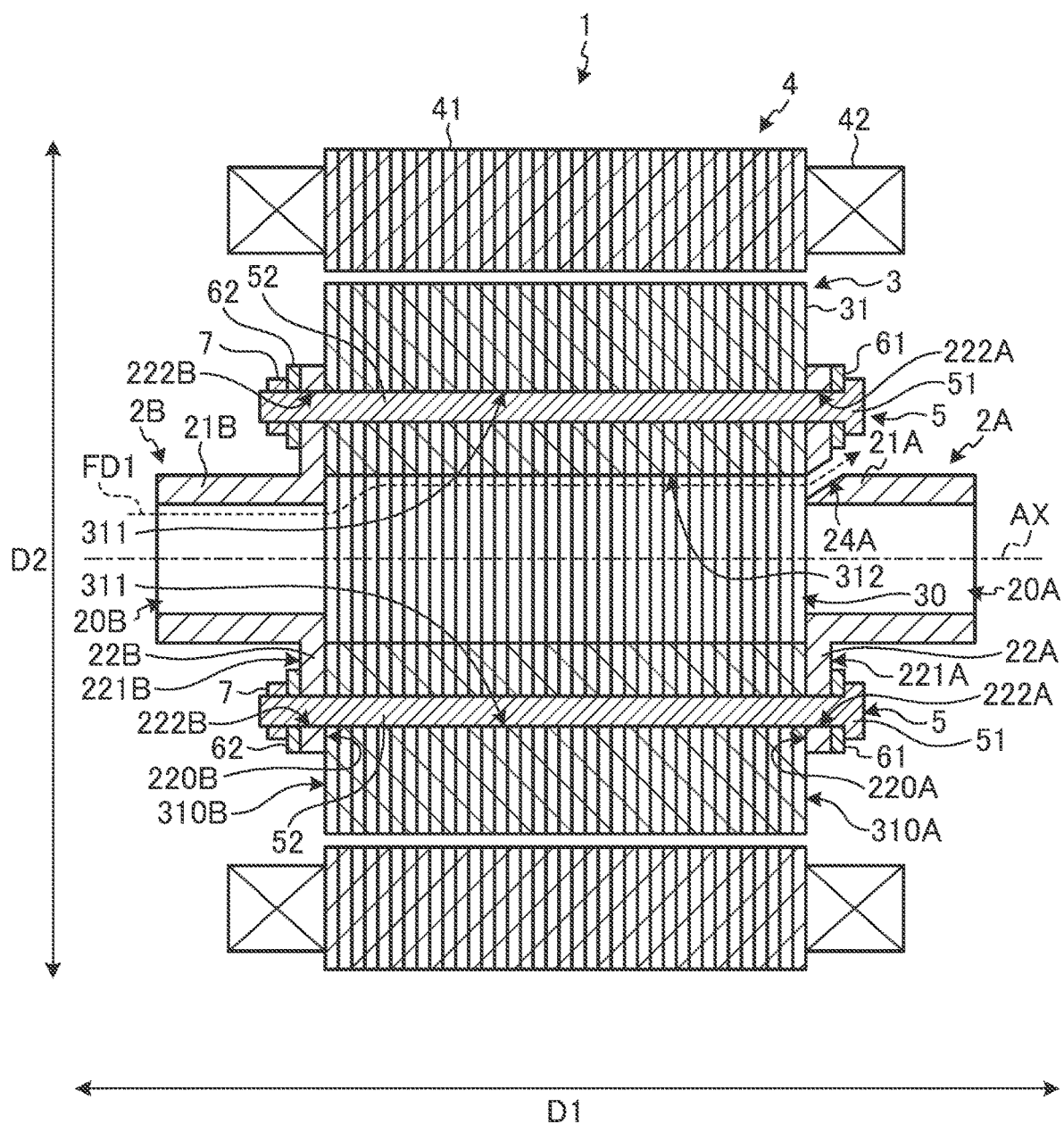
FIG. 16 is a cross-sectional view taken along the axis of a rotating electric machine according to a sixth embodiment.

FIG. 16 is a cross-sectional view taken along the axis AX of the rotating electric machine 1 according to the sixth embodiment. As shown in FIG. 16, in the rotating electric machine 1 of the sixth embodiment, the first flange portion 22A of the first shaft 2A is provided with at least one oil discharge hole 24A each serving as a flange through-hole that communicates with the through-hole 30 of the rotor core 31. The oil discharge hole 24A extends through the first flange portion 22A outward in a radial direction D2, from the same position as the inner circumferential surface 312 of the rotor core 31 in the radial direction D2, or a position radially inward of the surface 312, on the first contact face 220A of the first flange portion 22A, to the face 221A of the first flange portion 22A opposite to the first contact face 220A. Thus, as indicated by an arrow FD1 in FIG. 16, for example, cooling oil that flows into the second through-hole 20B of the second shaft 2B in the axial direction D1 flows into the through-hole 30 of the rotor core 31, and a part of the cooling oil that flows along the inner circumferential surface 312 of the rotor core 31 is discharged to the outside (to the radially outer side of the first shaft 2A), through the oil discharge hole 24A.

In this connection, where a single shaft that is longer than the rotor core 31 in the axial direction D1 is inserted through and fixed to the rotor core 31, the rotor core 31 is cooled by cooling oil via the shaft. Therefore, the thermal resistance is increased by an amount due to the presence of the shaft, and the rotor core 31 and the permanent magnets 32 provided in the rotor core 31 are less likely to be cooled.

On the other hand, in the rotating electric machine 1 of the sixth embodiment, the inner circumferential surface 312 of the rotor core 31 directly contacts with the cooling oil; therefore, the thermal resistance is reduced as compared with the above case where the rotor core 31 is cooled via the shaft, and the capability of cooling the rotor core 31 and the permanent magnets 32 can be enhanced. Also, in the rotating electric machine 1 of the sixth embodiment, a part of the cooling oil that flows along the inner circumferential surface 312 of the rotor core 31 is discharged through the oil discharge hole 24A; therefore, the cooling oil of which the temperature has been raised by heat from the rotor core 31, etc. is less likely or unlikely to remain on the inner circumferential surface 312 of the rotor core 31. Thus, it is possible to supply cooling oil having a relatively low temperature to the inner circumferential surface 312 of the rotor core 31, to further enhance the capability of cooling the rotor core 31 and the permanent magnets 32. Also, since the capability of cooling the permanent magnets 32 can be enhanced, it becomes possible to use permanent magnets having relatively low heat resistance, and thus reduce the cost.

In the rotating electric machine 1 of the sixth embodiment, the cooling oil discharged from the oil discharge hole 24A spreads as the rotor core 31 rotates, and cools constituent elements, such as a stator coil 42, of the rotating electric machine 1, which are provided in the vicinity of the rotor 3. Thus, in the rotating electric machine 1 of the sixth embodiment, the cooling performance of the cooling oil is enhanced, so that the output performance of the rotating electric machine 1 is enhanced, and the length of time for which the rotating electric machine 1 can operate with high output power can be extended.

While at least one oil discharge hole 24A is provided in the first flange portion 22A of the first shaft 2A located on the discharge side of the cooling oil, as indicated by the arrow FD1 in FIG. 16, in the rotating electric machine 1 of the sixth embodiment, the disclosure is not limited to this arrangement. For example, in FIG. 16, one or more oil discharge holes as flange through-holes that communicate with the through-hole 30 of the rotor core 31, like the oil discharge hole 24A, may be provided in the second flange portion 22B of the second shaft 2B located on the inlet side of the cooling oil. Namely, an oil discharge hole may be provided which extends through the second flange portion 22B outward in a radial direction D2, from the same position as the inner circumferential surface 312 of the rotor core 31 in the radial direction D2, or a position radially inward of the surface 312, to the face 221B of the second flange portion 22B opposite to the second contact face 220B.

In the rotating electric machine 1 according to the sixth embodiment, the male screws formed on the shaft portions 52 of the bolts 5 are engaged with the nuts 7, so that the first shaft 2A and the second shaft 2B are fastened, as in the rotating electric machine 1 according to the second embodiment. However, the disclosure is not limited to this arrangement. Namely, in the rotating electric machine 1 of the sixth embodiment, the male screws formed on the shaft portions 52 of the bolts 5 may be engaged with female screws formed in the second through-holes 222B of the second flange portion 22B, so that the first shaft 2A and the second shaft 2B are fastened, as in the rotating electric machine 1 of the first embodiment, for example. Also, in the rotating electric machine 1 of the sixth embodiment, the first shaft 2A and the second shaft 2B may be fastened with the rivets 8, as in the rotating electric machine 1 of the third embodiment, for example. Also, in the rotating electric machine 1 of the sixth embodiment, the first protruding portion 23A of the first shaft 2A and the second protruding portion 23B of the second shaft 2B may be fitted in the through-hole 30 that functions as first and second fitting portions provided on the same axis as the axis Ax of the rotor core 31, so that the first shaft 2A and the second shaft 2B are positioned relative to the rotor core 31, as in the rotating electric machine 1 of the fifth embodiment, for example.

Seventh Embodiment

In the following, a rotating electric machine as a seventh embodiment of the disclosure will be described. Description of portions common to the rotating electric machine 1 of the second embodiment and that of the seventh embodiment will be omitted as appropriate. The rotating electric machine of the seventh embodiment is used in the electric vehicle 100, for example, like the rotating electric machine 1 of the second embodiment.

Figure 17:
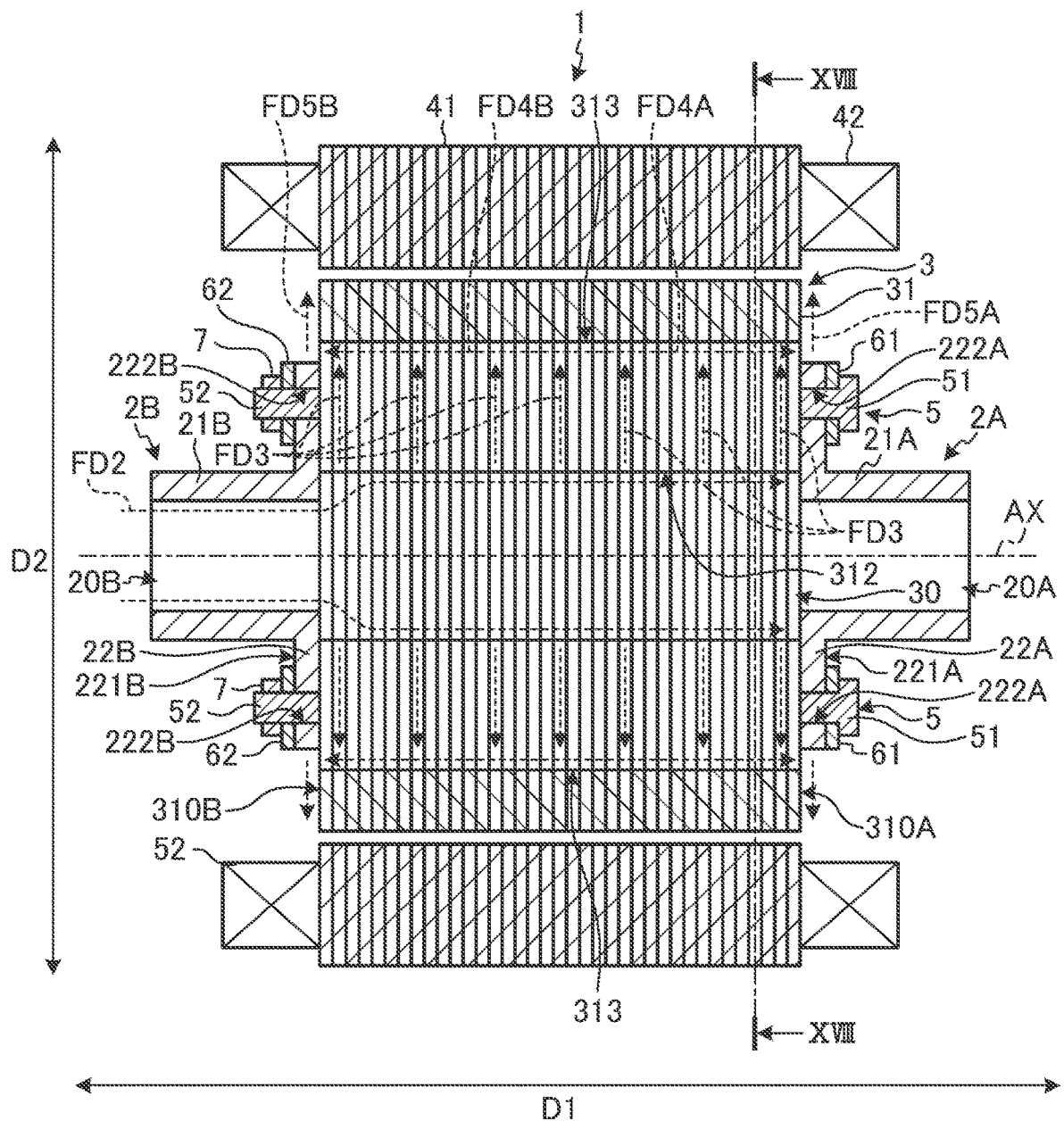
FIG. 17 is a cross-sectional view taken along the axis of a rotating electric machine according to a seventh embodiment.
Figure 18:
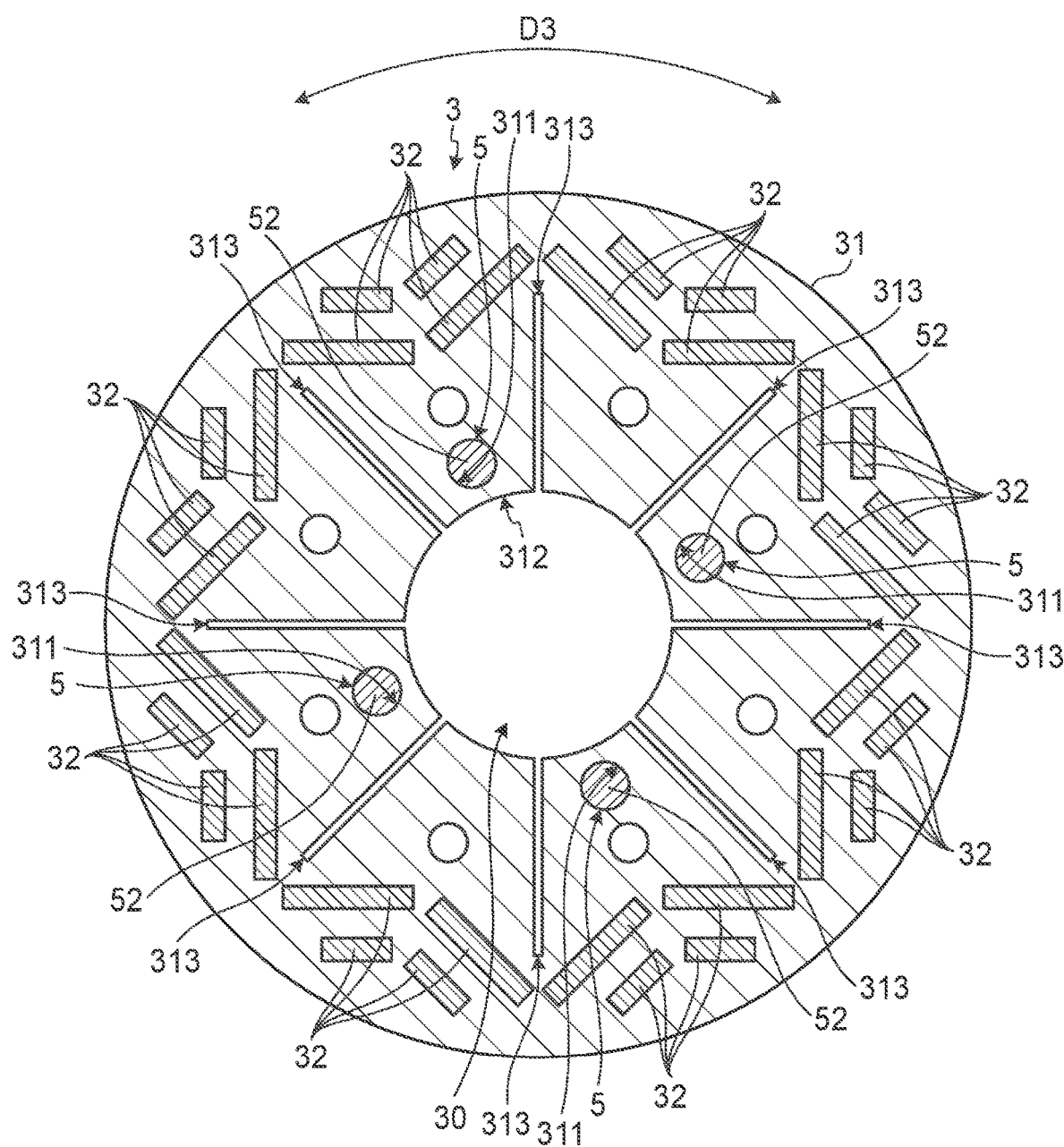
FIG. 18 is a cross-sectional view of a rotor in a XVIII-XVIII section in FIG. 17.

FIG. 17 is a cross-sectional view taken along the axis AX of the rotating electric machine 1 according to the seventh embodiment. FIG. 18 is a cross-sectional view of the rotor 3 in a XVIII-XVIII section in FIG. 17.

In the rotating electric machine 1 according to the seventh embodiment, a plurality of permanent magnets 32 are provided in a radially outer portion of the rotor core 31, such that two permanent magnets 32 are paired with those located adjacent to the permanent magnets 32 in the circumferential direction D3, and the paired permanent magnets 32 are arranged into a V shape that is open outward in a radial direction D2. Each pair of the permanent magnets 32 is arranged with same polarity. For example, the north (N) pole of each of the pair of permanent magnets 32 is directed outward in the radial direction D2 of the rotor core 31. Then, in another pair of permanent magnets 32 located adjacent to the above pair of permanent magnets 32 in the circumferential direction D3, the south (S) pole is directed outward in the radial direction D2. Thus, each pair of the permanent magnets 32 arranged in the V shape forms one magnetic pole. Namely, the rotor 3 includes eight magnetic poles in the radially outer portion, such that each of the magnetic poles consists of a pair of permanent magnets 32 arranged so as to spread into the V shape outward in the radial direction D2, and such that the N pole and the S pole are alternately arranged.

Also, in the rotor core 31, a plurality of slits 313 that extends from the inner circumferential surface 312 of the rotor core 31 to the vicinity of the permanent magnets 32 in the radial directions D2 is provided such that the slits 313 are spaced at given intervals in the circumferential direction D3. Outer ends of the slits 313 as viewed in the radial directions D2 are located on the outer side in the radial directions D2, of the profiles of the first flange portion 22A and second flange portion 22B of the first shaft 2A and second shaft 2B, respectively.

With this arrangement, a part of cooling oil that flows from the second through-hole 20B of the second shaft 2B into the through-hole 30 of the rotor core 31 in the axial direction D1, and flows along the inner circumferential surface 312 of the rotor core 31, as indicated by an arrow FD2 in FIG. 17, flows in the slits 313 to the vicinity of the permanent magnets 32 in the radial directions D2, due to the centrifugal force, etc. generated by rotation of the rotor core 31, as indicated by arrows FD3 in FIG. 17. Then, the cooling oil flows along the bottoms of the slits 313 toward the first shaft 2A side in the axial direction D1, as indicated by an arrow FD4A in FIG. 17, or toward the second shaft 2B side, as indicated by an arrow FD4B in FIG. 17. Then, as indicated by arrows FD5A, FD5B in FIG. 17, the cooling oil is discharged to the end face 310A and end face 310B of rotor core 31, and flows to the outer side in the radial directions D2 along the end face 310A and the end face 310B, for example.

In the rotating electric machine 1 according to the seventh embodiment, the cooling oil flows in the slits 313 provided in the rotor core 31, in the radial directions D2, to the vicinity of the permanent magnets 32; therefore, the capability of cooling the rotor core 31 and the permanent magnets 32 can be enhanced, as compared with the case where the rotor core 31 is cooled via a shaft. Also, in the rotating electric machine 1 of the seventh embodiment, a part of the cooling oil that flows along the inner circumferential surface 312 of the rotor core 31 is discharged through the slits 313; therefore, the cooling oil of which the temperature has been raised due to heat from the rotor core 31, etc. is less likely or unlikely to remain on the inner circumferential surface 312 of the rotor core 31. Thus, it is possible to supply cooling oil having a relatively low temperature to the inner circumferential surface 312 of the rotor core 31, to further enhance the capability of cooling the rotor core 31 and the permanent magnets 32. Also, since the capability of cooling the permanent magnets 32 can be enhanced, it becomes possible to use permanent magnets having relatively low heat resistance, and thus reduce the cost.

In the rotating electric machine 1 according to the seventh embodiment, the cooling oil discharged from the slits 313 to the end faces 310A, 310B of the rotor core 31 spreads as the rotor core 31 rotates, so as to cool constituent elements, such as the stator coil 42, of the rotating electric machine 1, which are provided in the vicinity of the rotor 3. Thus, in the rotating electric machine 1 of the seventh embodiment, the cooling performance of the cooling oil is enhanced, so that the output performance of the rotating electric machine 1 is enhanced, and the length of time for which the rotating electric machine 1 can operate with high output power can be extended.

Also, in the rotating electric machine 1 according to the seventh embodiment, the first shaft 2A and the second shaft 2B are fastened, by engaging the male screws formed on the shaft portions 52 of the bolts 5 with the nuts 7, as in the rotating electric machine 1 of the second embodiment. However, the manner of fastening the first shaft 2A and the second shaft 2B is not limited to this. For example, in the rotating electric machine 1 of the seventh embodiment, the first shaft 2A and the second shaft 2B may be fastened, by engaging the male screws formed on the shaft portions 52 of the bolts 5 with female screws formed in the second through-holes 222B of the second flange portion 22B, as in the rotating electric machine 1 of the first embodiment. Also, in the rotating electric machine 1 of the seventh embodiment, the first shaft 2A and the second shaft 2B may be fastened with the rivets 8, as in the rotating electric machine 1 of the third embodiment, for example. Also, in the rotating electric machine 1 of the seventh embodiment, the first protruding portion 23A of the first shaft 2A and the second protruding portion 23B of the second shaft 2B may be fitted in the through-hole 30 of the rotor core 31 which functions as the first and second fitting portions provided on the same axis as the axis AX, so that the first shaft 2A and the second shaft 2B are positioned relative to the rotor core 31, as in the rotating electric machine 1 of the fifth embodiment.

What is claimed is:

1. A rotating electric machine comprising:
   a rotor having a rotor core that is rotatable about an axis of the rotor core, the rotor core including:

a plurality of permanent magnets;

a core through-hole aligned with the axis of the rotor core;

a plurality of slits that radially extend from an inner circumferential surface of the rotor core defining the core through-hole toward the permanent magnets; and outer ends of the slits in a radial direction of the rotor core;

a stator having a stator core placed with a radial spacing from the rotor, and a stator coil provided on the stator core;

a first rotating shaft member having:
- a first flange portion having a first contact face that is in contact with a first end face of the rotor core in an axial direction, the outer ends of the slits extending further from the axis of the rotor core in the radial direction than the first flange portion;
- a first shaft portion provided on a face of the first flange portion opposite to the first contact face; and
- a first shaft member through-hole aligned with the axis of the rotor core and in communication with the core through-hole;

a second rotating shaft member having:
- a second flange portion having a second contact face that is in contact with a second end face of the rotor core in the axial direction, the outer ends of the slits extending further from the axis of the rotor core in the radial direction than the second flange portion;
- a second shaft portion provided on a face of the second flange portion opposite to the second contact face; and
- a second shaft member through-hole aligned with the axis of the rotor core and in communication with the core through-hole; and a fastening device that fastens the first rotating shaft member and the second rotating shaft member, in a condition where the rotor core is sandwiched between the first flange portion and the second flange portion, from opposite sides of the rotor core in the axial direction.

2. The rotating electric machine according to claim 1, wherein:
the rotor core includes a first fitting portion and a second fitting portion aligned with the axis of the rotor core;
the first rotating shaft member has a first fitted portion that is fitted in the first fitting portion; and
the second rotating shaft member has a second fitted portion that is fitted in the second fitting portion.

3. The rotating electric machine according to claim 1, wherein:
the fastening device comprises a plurality of bolts;
the rotor core has a plurality of bolt insertion holes through which the bolts are inserted, the bolt insertion holes extending through the rotor core in the axial direction;
the first flange portion has a plurality of first insertion holes, at positions corresponding to positions of the bolt insertion holes;
the second flange portion has a plurality of second insertion holes, at positions corresponding to the positions of the bolt insertion holes; and
the bolts have male screws, and the first insertion holes or the second insertion holes have female screws that engage with the male screws.

4. The rotating electric machine according to claim 1, wherein:
the fastening device comprises a plurality of bolts and a plurality of nuts;
the rotor core has a plurality of bolt insertion holes through which the bolts are inserted, the bolt insertion holes extending through the rotor core in the axial direction;
the first flange portion has a plurality of first insertion holes through which the bolts are inserted, at positions corresponding to positions of the bolt insertion holes; and
the second flange portion has a plurality of second insertion holes through which the bolts are inserted, at positions corresponding to the positions of the bolt insertion holes.

5. The rotating electric machine according to claim 1, wherein:
the fastening device comprises a plurality of rivets;
the rotor core has a plurality of rivet insertion holes through which the rivets are inserted, the rivet insertion holes extending through the rotor core in the axial direction;
the first flange portion has a plurality of first insertion holes through which the rivets are inserted, at positions corresponding to positions of the rivet insertion holes; and
the second flange portion has a plurality of second insertion holes through which the rivets are inserted, at positions corresponding to the positions of the rivet insertion holes.

6. The rotating electric machine according to claim 1, wherein:
at least one of the first flange portion and the second flange portion has a flange through-hole that communicates with the core through-hole.

* * * * *